United States Patent [19]

Pryor et al.

[11] Patent Number: 5,319,515

[45] Date of Patent: Jun. 7, 1994

[54] CIRCUIT PROTECTION ARRANGEMENT

[75] Inventors: Dennis M. Pryor; Ian P. Atkins; Michael Challis, all of Swindon; David M. Williams, Faringdon, all of England

[73] Assignee: Raychem Limited, United Kingdom

[21] Appl. No.: 774,686

[22] Filed: Oct. 11, 1991

[30] Foreign Application Priority Data

| Oct. 12, 1990 | [GB] | United Kingdom | 9022236 |
| Oct. 12, 1990 | [GB] | United Kingdom | 9022237 |
| Oct. 12, 1990 | [GB] | United Kingdom | 9022261 |
| Dec. 5, 1990 | [GB] | United Kingdom | 9026518 |
| Jan. 7, 1991 | [GB] | United Kingdom | 9100283 |
| Sep. 30, 1991 | [GB] | United Kingdom | 9120726 |

[51] Int. Cl.$^5$ .......................................... H02H 3/00
[52] U.S. Cl. ........................... 361/93; 361/71; 361/18; 361/100
[58] Field of Search ............... 361/56, 58, 111, 118, 361/119, 18, 86, 72, 100, 71

[56] References Cited

U.S. PATENT DOCUMENTS

| 3,617,655 | 11/1971 | Fischer | 179/170.4 |
| 3,801,872 | 4/1974 | Zocholl et al. | 317/22 |
| 3,916,220 | 10/1975 | Roveti | 307/251 |
| 4,110,809 | 8/1978 | Cronin | 361/95 |
| 4,202,023 | 5/1980 | Sears | 361/18 |
| 4,241,372 | 12/1980 | Sears | 361/72 |
| 4,423,457 | 12/1983 | Brajder | 361/86 |
| 4,513,343 | 4/1985 | Ryczek | 361/101 |
| 4,533,970 | 8/1985 | Brown | 361/58 |

(List continued on next page.)

FOREIGN PATENT DOCUMENTS

| 48128/85 | 9/1985 | Australia | H02H 3/087 |
| 0147818 | 7/1985 | European Pat. Off. | H02H 3/02 |
| 0252541 | 1/1988 | European Pat. Off. | H02H 3/087 |
| 0356186 | 2/1990 | European Pat. Off. | H02H 9/02 |
| 1233475 | 2/1967 | Fed. Rep. of Germany |  |
| 2147471 | 7/1973 | Fed. Rep. of Germany | H02H 7/20 |
| 2431167 | 1/1976 | Fed. Rep. of Germany | H02H 7/22 |
| 2440947 | 3/1976 | Fed. Rep. of Germany | G05F 1/58 |
| 3204338 | 1/1983 | Fed. Rep. of Germany | H02H 7/20 |

(List continued on next page.)

OTHER PUBLICATIONS

"Various Types of Power Supply Protection Circuits", *Switching Power Supply Units,* Chapter 8, (pp. 209–229).
"Using UC3840 in Designing a Switching Power Supply", *Collection of Transistor Circuit Manufacturing,* pp. 150–161.
"Switching Mode Power Supply", pp. 52–62.
British Search Report, Application No. 9022236.5, Jan. 25, 1991.

(List continued on next page.)

*Primary Examiner*—A. D. Pellinen
*Assistant Examiner*—S. W. Jackson
*Attorney, Agent, or Firm*—Marguerite E. Gerstner; Timothy H. P. Richardson; Herbert G. Burkard

[57] ABSTRACT

A number of arrangements for protecting an electrical circuit from an electrical overcurrent are disclosed. In the arrangements the base or gate of a switching transistor (4, 101, 161, 222, 401) is held in a voltage divider, one arm of which comprises a control transistor (6, 102, 162, 222, 404) whose base or gate is itself held in a voltage divider. When an overcurrent is experienced the control transistor switches on causing the switching transistor to turn off. The arrangement may include a shunt switching circuit to shunt the overcurrent across the load. It may include a resetting circuit that will attempt to reset the switching circuit after the overcurrent has been experienced. In one embodiment the arrangement includes means such as a battery, dc—dc voltage converter or Seebeck device in order to reduce or eliminate any initial voltage drop across the switching circuit.

10 Claims, 11 Drawing Sheets

U.S. PATENT DOCUMENTS

| | | | |
|---|---|---|---|
| 4,536,699 | 8/1985 | Baker | 323/276 |
| 4,594,633 | 6/1986 | Townsend et al. | 361/57 |
| 4,604,674 | 8/1986 | Hamel | 361/73 |
| 4,736,268 | 4/1988 | Wagoner | 361/111 |
| 4,744,369 | 5/1988 | Kroll | 128/696 |
| 4,771,357 | 9/1988 | Lorinez et al. | 361/87 |
| 4,799,126 | 1/1989 | Kruse et al. | 361/101 |
| 4,811,156 | 3/1989 | Kroll | 361/58 |
| 4,835,649 | 5/1989 | Salerno | 361/18 |
| 4,853,820 | 8/1989 | Ham, Jr. et al. | 361/59 |
| 4,937,697 | 6/1990 | Edwards et al. | 361/18 |

FOREIGN PATENT DOCUMENTS

| | | | |
|---|---|---|---|
| 3433538 | 3/1986 | Fed. Rep. of Germany | G05F 1/569 |
| 3705177 | 6/1987 | Fed. Rep. of Germany | H02H 3/08 |
| 3725390 | 2/1989 | Fed. Rep. of Germany | H02H 3/08 |
| 276572 | 9/1990 | Fed. Rep. of Germany | H02H 7/00 |
| 2619262 | 2/1989 | France | H02H 9/02 |
| 57-129125 | 8/1982 | Japan | H02H 3/46 |
| WO86/03079 | 5/1986 | PCT Int'l Appl. | H03K 17/687 |
| 107500 | 1/1989 | Taiwan | H02H 3/00 |
| 148095 | 12/1990 | Taiwan | H02H 3/18 |
| 976862 | 12/1964 | United Kingdom | H02H 3/087 |
| 1157169 | 7/1969 | United Kingdom | H04B 3/36 |
| 1175895 | 1/1970 | United Kingdom | H03H 11/00 |
| 1467055 | 3/1977 | United Kingdom | H02H 3/08 |
| 1481458 | 7/1977 | United Kingdom | H03K 17/08 |
| 1497690 | 1/1978 | United Kingdom | H02H 7/20 |
| 2145593 | 3/1985 | United Kingdom | H02H 3/087 |
| 2167915 | 6/1986 | United Kingdom | H02H 3/22 |
| 2208193 | 3/1989 | United Kingdom | H02H 3/08 |

OTHER PUBLICATIONS

British Search Report, Application No. 9022237.3, Jan. 25, 1991.

British Search Report, Application No. 9022261.3, Jan. 25, 1991.

British Search Report, Application No. 9027111.5, Mar. 26, 1991.

British Search Report, Application No. 9100283.2, May 28, 1991.

British Search Report, Application No. 9120727.4, Dec. 5, 1991.

International Search Report, Application No. PCT/GB91/01760, filed Oct. 10, 1991.

International Search Report, Application No. PCT/GB91/01761, filed Oct. 10, 1991.

International Search Report, Application No. PCT/GB91/02215, filed Dec. 12, 1991.

International Search Report, Application No. PCT/GB92/00027, filed Jan. 7, 1992.

Siemens–Bauteile Informationen/Horst von Pelka, vol. 4, #6, 1968, Munchen DE, pp. 106–109.

Siemens Fachbucher, Circuits with Semiconductor Components, vol. 4, pp. 199–202, Erich Gelder & Walter Hirschmann.

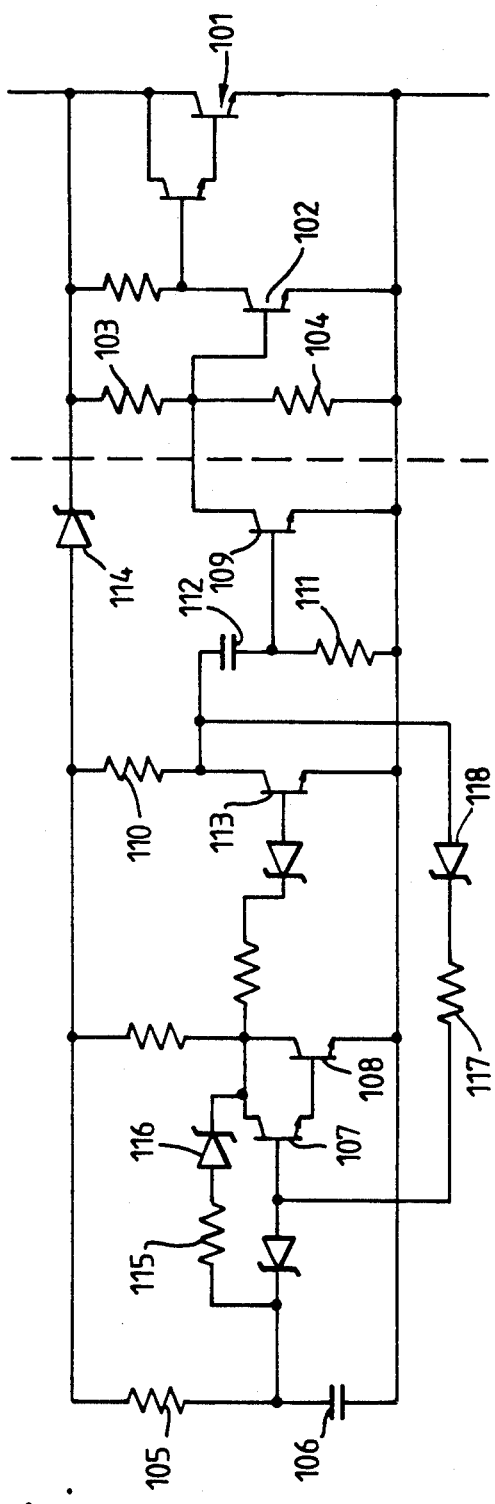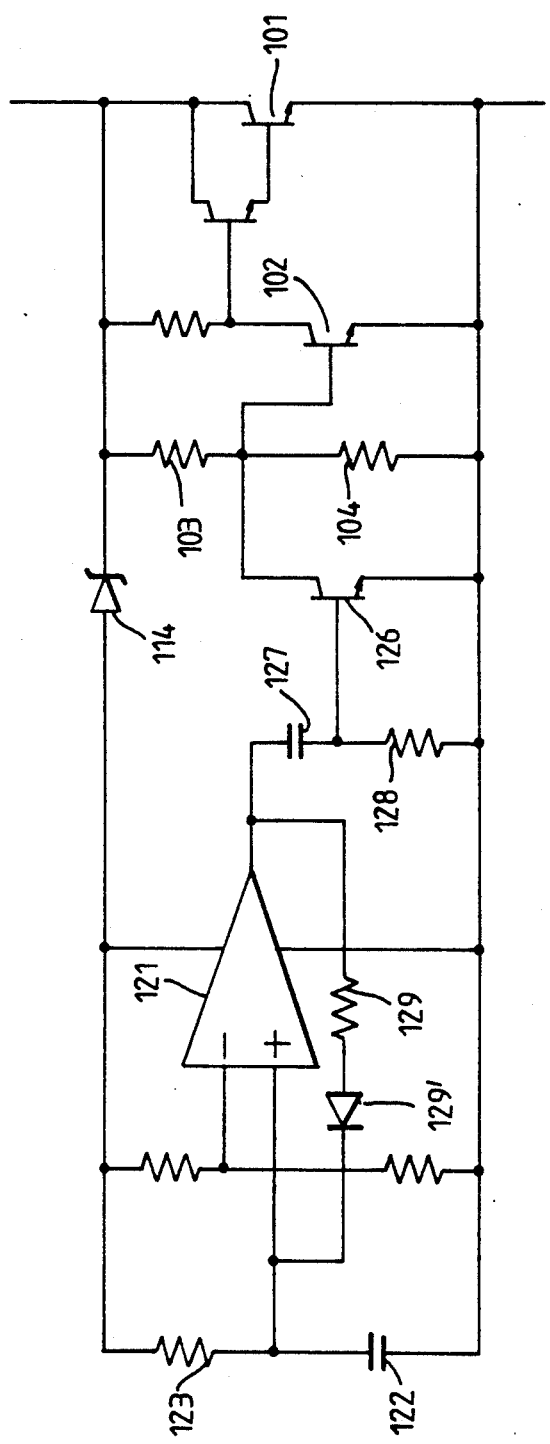
Fig. 5.
Fig. 6.

CIRCUIT PROTECTION ARRANGEMENT

This invention relates to arrangements and devices for protecting electrical circuits from overcurrents, for example from overcurrents caused by equipment faults or transient overcurrents caused by lightning, electrostatic discharge, equipment induced transients or other threats.

Many circuit protection devices have been proposed for the protection of electronic circuits from overcurrents and overvoltages. For example voltage controlled triacs are employed for protecting certain systems such as telephone circuits from overvoltages. The devices are connected between the lines and ground and will fire in order to shunt any voltage transient when the transient voltage on the line reaches a predetermined value (typically 200 V) and will remain in their on state until the current passing through them is reduced to below a certain value, the holding current. Such devices have the disadvantage that once they have fired they can be latched in their on state by the dc power source of the telephone line which is quite capable of delivering short circuit currents in the order of 200 mA. While conventional triacs normally have a holding current of up to 50 mA, triacs having higher holding currents, for example 300 mA need to be employed in order to overcome the latching problem. However, these triacs have the disadvantage that, when subject to certain transients, they may switch incompletely and remain at a high voltage of 200 V or thereabouts while passing a current of 200 mA with the result that the device and possibly other equipment may be violently damaged. One circuit that has been proposed for use with telephone systems is described in French patent application No. 2,619,262. This circuit comprises a combined overvoltage and overcurrent protection device in which a comparison circuit compares the voltage on one of the lines with a reference voltage and, if it is greater, the transient is shunted across the load and a series electronic switch is opened. This device, however, suffers from the disadvantage that it will not be triggered by a system failure leading, for example, to a short circuit and damage to the series switch may occur due to the currents experienced. In addition, a significant amount of the overcurrent transient may pass through the device before the series switch is opened. The device has the further disadvantage that the voltage protection circuit merely limits the transient voltage to a maximum value. Since significant transient current flows through this part of the circuit, unacceptable heating can occur.

According to one aspect the present invention provides a circuit protection arrangement, which comprises a series switching circuit that is intended to be connected in a line of the circuit, and will switch to an open state when subjected to an overcurrent, and a shunt switching circuit that is open under normal operating conditions but will shunt the overcurrent across the load of the circuit or to ground when triggered by the series switching circuit.

The arrangement according to the invention has the advantage that it is possible to protect the load circuits not only from threats that cause an overvoltage to be generated, but also from those that cause an overcurrent, e.g. systems failures as mentioned above. In addition, the fact that the series switching circuit is actuated directly by the pulse rather than by a shunt switching circuit can reduce the delay in isolating the load circuit from the threat.

In a telephone system the shunt switching circuit will be connected directly between one incoming wire and ground and the series switching circuit will be connected in the wire between the shunt switching circuit and the exchange equipment. The second wire will be connected in a corresponding manner. When the system is subjected to a transient the series switching circuit will open and at the same time will cause the shunt switching circuit to close so that the transient is shunted to ground. System current cannot flow from the exchange equipment and cause the shunt switching circuit to latch because the series switching is open. After the transient has passed the system voltage will be dropped across the series switching circuit. This circuit will reset to its normal state as soon as the line to the subscriber is made open circuit, i.e. by the subscriber replacing the handset.

In a preferred form of arrangement the series switching circuit includes a series switching transistor that controls the current flow through the series switching circuit. The series switching transistor is preferably controlled by a series control transistor that forms one arm of a voltage divider connected to the base or gate of the series control transistor. The base or gate voltage of the series control transistor is dependent on the voltage drop across the series switching transistor so that, as the voltage drop across the series switching transistor increases, the forward biasing of the series control transistor increases. As the series control transistor becomes more conductive the reverse biasing of the series switching transistor increases causing the switching transistor to switch to its blocking state. As soon as this has occurred the voltage drop across the switching transistor will increase substantially causing the control transistor to remain in its "ON" or low resistance state and hence the series switching transistor to remain in its blocking state until the arrangement is reset.

Thus, it is possible for the arrangement to include no resistive components in series with the series switching transistor, so that any voltage drop across the series switching circuit is solely due to the collector-emitter or drain-source voltage drop of the series switching transistor (and any rectifying diodes). In addition, the absence of a series resistor reduces the number of load current carrying components which allow easier integration of the device.

The shunt switching circuit preferably comprises a voltage foldback device that is connected between the line of the circuit and a return line or ground. The foldback device should be capable of being triggered by a pulse supplied by the remainder of the shunt switching circuit, and so thyristors or triacs are preferred. The shunt switching circuit preferably has no resistive components in series with the foldback device so that the voltage drop between the line and the return line or ground is solely due to the voltage drop across the foldback device. In this way the energy dissipation in the shunt switching circuit when the transient is shunted is minimized.

The shunt switching circuit may include a shunt switching transistor that is arranged to switch current from the line to the foldback device. In this case the base or gate bias of the shunt switching transistor may be controlled by a shunt control transistor whose base or gate voltage depends on the voltage drop across the series switching circuit. For example, the base or gate of the shunt switching transistor may be connected to a voltage divider that spans the switching circuit, one arm of which comprises the shunt control transistor. The base or gate voltage of the shunt control transistor may, in this case, be determined by the series switching circuit so that, for example, switching of the series switching circuit reverse biases the shunt control transistor which causes the shunt switching transistor to become forward biased.

This form of three terminal protection device whether or not it includes the voltage foldback device is novel and so, according to a second aspect the invention provides a circuit protection arrangement, which comprises a switching circuit that is intended to be series connected in a line of the circuit to be protected and which will allow normal circuit currents to pass but will switch to a blocking state when subjected to an overcurrent, the arrangement including a shunt terminal which includes a shunt switching transistor whose base or gate voltage is altered depending on the state of the switching circuit so that, under normal circuit conditions the shunt switching transistor is in a blocking state, but when the switching circuit switches to a blocking state the shunt switching transistor is biased to a conducting state.

The arrangement according to the second aspect of the invention preferably comprises series and shunt switching circuits as described above.

In operation the shunt terminal may be connected directly to the return line of the electrical circuit in order to shunt any overcurrent across the load. In this arrangement the transient current is able to be shunted across the load passing only through a transistor switch, so that the temperature rise in the arrangement can be held to a relatively low value. In some instances it may be left unconnected so that the arrangement is employed as a two-terminal device. Often it will be appropriate to connect the shunt terminal to other components, for example, it may be connected to the return line via a load having substantially the same impedance as that of the line and/or of the electrical circuit, in order to prevent or reduce the occurrence of reflections in the line. Such an arrangement may, for instance, be employed in a local area network (LAN) in which a number of stubs extend from a main bus. If any of the equipment associated with the stubs fails this will alter the load on the bus, with the result that only a limited number of equipment failures can be accommodated before the whole LAN stops functioning. If instead the arrangement switches a matched load into the circuit, the LAN will continue functioning even with a large number of equipment failures.

Alternatively, the shunt terminal may be connected to a transient absorbing load. Where it is likely that the overcurrent will be caused by a fault in the electrical circuit, it may be appropriate for the signal transmitted by the third terminal to switch in a backup system. It may not be necessary for the shunt switching transistor to pass the entire overcurrent. Instead it may be connected to an additional circuit protection device that is capable of passing larger currents than the shunt switching transistor, preferably a foldback or crowbar device such as a thyristor or a triac, in order to trigger the additional device as described above.

Where the series switching circuit includes a switching transistor for controlling the current flow through the circuit, the base-emitter or gate-source voltage of the series switching transistor and of the shunt control transistor may be held to the same value as one another, for example, by direct connection of the relevant terminals. In such a case, provided that the two transistors have similar characteristics, they will both be in the same state as one another. Each of the series transistor's parameters will vary with temperature, the characteristic of the control transistor dominating that of the switching transistor since the control transistor is in its high resistance state during normal operation. The changing parameters of the series control transistor causes it to turn ON at lower voltages, thereby reducing the trip current of the arrangement with increasing temperature. This effect can be compensated either by making the resistor in parallel with the control transistor gate and source have a positive temperature coefficient of resistance (PTC) or by making the resistor connected to the switching transistor base or gate have a negative temperature coefficient or resistance (NTC). This latter option is preferred for arrangements that are formed as monolithic devices.

In operation the shunt terminal may be connected directly to the return line of the electrical circuit in order to shunt any overcurrent across the load or, for example in the case of a balanced pair in a telephone system, may be connected to ground. In this arrangement the transient current is able to be shunted across the load or to ground passing only through a foldback device, so that the power dissipated in the arrangement can be held to a relatively low value.

The arrangement may be employed as a three terminal arrangement where a single pair of lines incorporates the arrangement. However, five terminal devices may be formed, in which a pair of three terminal arrangements have a common third terminal or even a common shunt switching arrangement. In addition, a four terminal device may be formed, for example for protecting a balanced pair of lines, in which the shunt switching circuit will shunt the threat across the pair.

Many electrical circuits, for example telephone systems and other information distribution systems, are subjected both to transient overcurrents and to overcurrents of long duration for instance due to equipment failure or short circuits caused by damage to equipment. In such cases it would be desirable to incorporate in the system a device that would protect the system against both types of overcurrent but would automatically allow the system to continue functioning after a transient overcurrent has passed.

One such arrangement is described in Australian Patent Application No. 48128/85 to Glynn et al in which a pair of switching transistors in Darlington configuration is connected in series with a circuit line, the base of which is controlled by a silicon controlled rectifier (SCR) that senses the voltage drop across a resistor in series with the switching transistor. In addition, resetting circuitry is provided to reset or attempt to reset the switching arrangement periodically in the event that it trips. Another overcurrent protection circuit that will reset itself into normal operation after a transient overcurrent is described in U.S. Pat. No. 4,202,023 to Sears. However, both these circuits have a number of drawbacks. For example, the presence of a series resistor adds to the voltage drop across the device in use and will increase the difficulty and cost of manufacturing the arrangement in integrated circuit form because the resistor will have to carry load current in normal use. Also, both circuits will attempt to reset themselves indefinitely when the system is subject to a long-duration overcurrent such as caused by equipment failure with the result that it may be necessary to switch the system off before the fault can be repaired. Furthermore, in the case of the Glynn et al circuit, when the arrangement has tripped into its OFF state there will remain a relatively high leakage current through the SCR in the order of 10 to 20 mA.

Thus, according to a further aspect of the invention there is provided an overcurrent protection arrangement, which comprises a switching circuit that is intended to be series connected in a line of the circuit to be protected and which will allow normal circuit currents to pass but will open when subjected to an overcurrent, the arrangement including a pulse generator which, when the switching circuit has opened, will generate pulses to a predetermined finite maximum number or for a predetermined time that reset, or attempt to reset, the switching circuit to its conducting state.

The invention according to this aspect has the advantage that the number of pulses that is generated in order to reset or to attempt to reset the arrangement, or the time for which they are generated, is limited so that, for example, in the case of equipment failure the source is not continually switched into the faulty equipment. Thus, the protection can discriminate between transients and persistent system faults. In the case of an overcurrent the switching circuit will rapidly switch off and will then reset itself or attempt to reset itself one or more times in case the overcurrent is due to an externally induced transient. However, if the overcurrent persists, for example if it is caused by a fault in the load circuit, the switching circuit will immediately revert to its OFF state as soon as the resetting pulse ends. Once this has occurred for the predetermined number of pulses the arrangement will remain in its OFF state indefinitely.

The switching circuit is preferably of the form described above with reference to the series switching circuit, that is to say it preferably comprises a switching transistor that is intended to be series connected in the circuit line, and a control transistor that determines the base or gate voltage of the switching transistor, and whose base or gate voltage depends on the voltage drop across the switching circuit. For example, the control transistor may form one arm of a voltage divider which spans the switching transistor and which sets the base or gate bias of the switching transistor, the control transistor being connected in parallel with the base and emitter or gate and source of the switching transistor. The base or gate bias of the control transistor may also be determined by a voltage divider that spans the switching transistor. In normal operation of this form of switching circuit, when no current passes along the circuit line both the switching and the control transistor are off. As the voltage on the line increases the base or gate forward bias of the switching transistor rises due to the relatively high resistance of the control transistor in its off state, until the switching transistor turns on. In normal operation the arrangement will allow the circuit current to pass with a small voltage drop across the switching transistor of about 1.5 V in the case of an enhancement mode MOSFET or about 0.65 V in the case of a single bipolar junction transistor.

When the line is subjected to an overcurrent, the voltage drop across the switching transistor increases, hence the base or gate forward bias of the control transistor increases until the control transistor turns ON, thereby shorting the base and emitter or the gate and source of the switching transistor and turning the switching transistor OFF. As this occurs the voltage across the switching transistor increases, so increasing the forward bias of the control transistor base or gate and locking the arrangement in the OFF state even if the overcurrent transient passes.

If the switching circuit has this configuration, the pulse generator is preferably arranged to short the base and emitter or gate and source of the control transistor, thereby turning it OFF which in turn will turn the switching transistor ON. This may be achieved by providing a resetting transistor for "shorting" the base and emitter or gate and source of the control transistor, the base or gate voltage of the resetting transistor being taken from the pulse generator.

Another form of switching circuit may be provided by a transistor switch that controls the circuit current and has a control input, and a control arrangement that controls the voltage of the control input and is responsive to an overcurrent through the switch, the control arrangement comprising a comparator circuit that compares a fraction of the voltage across the switch with a reference voltage and opens the switch if the fraction is greater than the reference voltage.

This arrangement has the advantage that it enables much flatter performance variations with respect to temperature to be obtained. In addition, it is possible to run the circuit protection arrangement according to the invention at considerably higher circuit currents without the danger of it tripping under the normal circuit current. In many cases the arrangement can be operated with up to 80% of the trip current without danger of it tripping.

Preferably the comparator circuit is powered by the voltage drop that occurs across the transistor switch, thereby obviating the need for any separate power supply.

The simplest form of arrangement may comprise a comparator circuit, for example in the form of an open loop operational amplifier, having one input terminal that is connected to a voltage reference and another terminal that samples the voltage difference across the switch by means of a voltage divider. The voltage reference should have a relatively temperature stable performance, preferably having a temperature coefficient of not more than $\pm 0.5\% K^{-1}$, more preferably not more than $\pm 0.2\% K^{-1}$ and especially not more than $0.1\% k^{-1}$. Normally a Zener diode or band gap device will be employed as the voltage regulator.

The pulse length, separation and number will all depend on the application. Typically a pulse of up to 15, and preferably up to 250 ms will be generated, with a pulse separation of 1s to 1 hour. The arrangement will normally incorporate a pulse generator that generates a small number of resetting pulses before stopping, for example up to 10, and especially up to 3 pulses. In many devices it may be desirable for the pulse generator to generate a single pulse only before stopping, so that the protection arrangement can distinguish between a transient in the line and an overcurrent that is due to a fault in the load circuit.

Any of a number of means may be used to generate the pulses. Especially where a large number of pulses is intended to be generated, for example they may be generated by an astable oscillator known per se. In order to provide a sufficient time delay between the pulses, it may be appropriate for the pulse generator to include a divider, for example a counter or shift register, whose input is supplied by a relatively fast oscillator, e.g. a crystal device or other circuit. Indeed, it may be possible for the user to specify the pulse frequency by selecting the divider output that attempts to reset the switch. The output of the divider will normally be fed to the comparator input via a high pass filter although a monostable oscillator could be used. If the pulse generator or any other components need a power supply, it is usually simplest to take the supply from the voltage difference across the switch optionally after appropriate voltage regulation, for example by means of a Zener diode.

In the series switching arrangements described above in normal operation there will always be a voltage drop across the arrangement before it will conduct current, this voltage drop being due to the base-emitter junction voltage of the switching transistor added to the voltage drop across the base resistor in the case of bipolar arrangements. In the case of arrangements based on enhancement mode FETs, the voltage drop will be due to the threshold voltage of the switching transistor. The voltage drop prevents this form of circuit protection arrangement being used in a number of applications for example where a linear system is required and can lead to heat generation problems in high current applications.

According to yet another aspect, the present invention provides a circuit protection arrangement that is intended to be series connected in a line of the circuit, which comprises a transistor switch that controls the circuit current and has a control input, and a control arrangement that controls the voltage of the control input and is responsive to an overcurrent through the switch, the arrangement including a voltage source which biases the control input of the switch into or toward conduction in normal operation.

In one simple form of the invention the switch may comprise a pass transistor, and the control arrangement may comprise another transistor that controls the base or gate of the pass transistor. Thus, according to another aspect, the invention provides a circuit protection arrangement that is intended to be series connected in a line of the circuit, which comprises a series switching transistor that controls the circuit current, and a control transistor that controls the base or gate voltage of the switching transistor and will switch the switching transistor OFF in response to an overcurrent through the switching transistor, the arrangement including a voltage source applied to the base or gate of the switching transistor which biases the switching transistor into or toward conduction in normal operation.

The arrangement according to this aspect of the invention has the advantage that it is possible to reduce, or even to eliminate, the initial voltage drop across the switching transistor before the transistor conducts. Thus it is possible, in normal operation, for the only voltage drop across the switching transistor to be due to its collector resistance or its channel resistance. The voltage source may have any value up to or even higher than that required to bias the switching transistor into conduction, the initial voltage drop across the switching transistor reducing as the voltage source potential rises.

The voltage source may be provided by any of a number of devices the particular choice depending on a number of factors including the current that will be drawn from the voltage source. For example, it may comprise a battery. In an FET device one end of the battery will normally be connected to the node formed by the gate of the switching transistor and the drain of the control transistor, so that the nominal currents that the voltage source will be expected to generate will be in the order of picoamps. Thus, the battery may be formed as a small lithium cell having only a very small capacity, e.g. in the order of 1 mAh which can be incorporated into an integrated circuit package and will have a lifetime of a number of years. The voltage source is preferably connected in series with a current limiting resistor, especially where a battery is employed, in order to prevent discharging of the battery when an overcurrent is experienced and the control transistor is turned ON.

Another form of voltage source that may be employed is a thermoelectric device such as a Seebeck device. Such a device is advantageously located in thermal contact with the switching transistor so that heat generated by the switching transistor flows through the device. This arrangement has the advantage that the thermoelectric device provides a feedback arrangement in which an increase in heat generation in the switching transistor caused by the voltage drop across the switching transistor, increases the base or gate offset voltage and so reduces the voltage drop. For relatively low frequency changes in the circuit current, this feedback can effectively reduce the switching transistor channel resistance.

Yet another voltage source that can be used is a dc—dc voltage converter. Such converters are two-part networks which take a low voltage dc input and produce a higher dc voltage output. The converter may be used to increase the voltage from another voltage source such as a Seebeck device mentioned above, or it may be connected across the switching transistor so that the voltage drop across the switching transistor is multiplied and fed into its base or gate.

Other forms of voltage source that may be employed include photovoltaic devices and capacitors that are charged up, for example by voltage multiplication or by top-up charging when the switching transistor is off. Alternatively, a separate supply may be employed for the voltage source, for example a rectified mains supply.

If desired the base or gate voltage of the control transistor may be determined by a voltage divider that spans the switching transistor so that the trip current of the arrangement is determined by the switching transistor channel resistance and the proportion of the voltage drop across the switching transistor that is fed into the gate of the control transistor. Alternatively, the base or gate of the control transistor may be connected directly to the collector or drain of the switching transistor so that the arrangement will trip if the overcurrent voltage drop across the switching transistor exceeds the turn-on voltage of the control transistor.

According to a further aspect, the invention provides an electrical circuit which comprises a voltage or current supply, a load and a current-carrying line connecting the supply and load, the circuit including a circuit protection arrangement that is series connected in the current-carrying line and which comprises a transistor switch that controls the line current and has a control input, and a control arrangement that controls the voltage of the control input and is responsive to an overcurrent through the switch, the arrangement including a voltage source which biases the control input of the switch into or toward conduction in normal operation.

According to yet another aspect, the invention provides a circuit protection arrangement that is intended to be series connected in a line of the circuit, which comprises a transistor switch that control the line current and has a control input, and a control arrangement that controls the voltage of the control input and is responsive to an overcurrent through the switch, the arrangement including a pair of open terminals for connection to a voltage source so that when a voltage source of the correct polarity is connected to the terminals it will bias the control input into or toward conduction in normal operation.

Another aspect of the invention is concerned with the protection of circuits that carry ac signals together with dc or low frequency ac power.

One important type of circuit that carries both signals and power is that used for cable television. CATV systems usually include one or more coaxial lines, typically 50 or 75 ohm, for carrying the signal from the transmission station to the subscribers' homes, each line being split a number of times so that a large number of subscribers can be served by each line that originates from the transmission station. Since the signal power is reduced each time the line is split, signal amplifiers are installed in the lines at periodic intervals. The power supply for the amplifiers is also carried by the line so that, in addition to the CATV signal having frequencies typically of 10 to 1000 MHz, the line will carry a 10 to 50 V dc or low frequency ac power supply. The CATV system is protected against shorting of the conductors or other faults by means of fuses or bimetal protectors located in the transmission station/distribution point. The fuses are located in the transmission station rather than in the cable because they need to be replaced after they have blown and so must be accessible. Similarly, bimetal protectors are located in the transmission station because they require a controlled environment in order to function correctly and also because their reliability is such that they often need to be replaced. In addition, bimetal protectors cannot be impedance matched to the coaxial cable without them needing to be physically very large which would render them too cumbersome.

Thus the current CATV systems suffer from the problem that if a fault is experienced somewhere in the line, the entire line will stop functioning. Not only is this inconvenient for the subscribers, but it can be difficult and time consuming to trace exactly where the fault occured and cause loss of revenue to the CATV company.

According to this aspect, the present invention provides a module for insertion into a combined signal and power carrying line for protecting a system associated with the line from an overcurrent, which comprises:
  (i) a housing having connection ports for cables forming the line and being impedance matched to the line, one of the conductors of the cables being connected together via a capacitor; and
  (ii) a solid-state overcurrent protection circuit that is connected across the capacitor via inductors to isolate it from the signal on the line, the protection circuit being capable of switching from a conducting to a blocking state in response to an overcurrent and being capable of resetting itself or attempting to reset itself into its conducting state one or more times after it has switched into its blocking state.

According to another aspect, the invention provides an electrical system that includes a line that carries both signals and dc or low frequency ac power and is protected from an overcurrent by means of a device inserted in the line that comprises:
  (i) a housing that is impedance matched to the line and contains a capacitor that is series connected in one of conductors of the line; and
  (ii) a solid-state overcurrent protection circuit that is connected across the capacitor via inductors to isolate it from the signal on the line, the protection circuit being capable of switching from a conducting to a blocking state in response to an overcurrent and being capable of resetting itself or attempting to reset itself into its conducting state one or more times after it has switched into its blocking state.

The module according to the invention has the advantage that it can be located in a line of the system between the source and the load, and a number of such modules may be located at different points in the line. For example, in the case of a CATV system, it would be possible to include one or more modules in association with each splitter in the line if desired. If the line is subjected to an overcurrent, for example due to a short circuit or other fault in the line, the protection device in the nearest module upstream of the fault will switch so that only that part of the line downstream of the module that has switched will be affected. Not only will this considerably reduce the number of subscribers that are affected by the fault, but tracing the fault is much simpler because the section of the line in which the fault occured is known from which protection circuit tripped. Furthermore, if the system is subjected to a overcurrent of short duration the protection circuit will automatically reset after the overcurrent has passed.

The protection device is preferably a two terminal circuit and one which requires no external source of power. The protection circuit need not have a linear response since it is isolated from the signal path. One form of protection circuit that may advantageously be used is that described above in which a switching transistor that is series connected in the dc line, and a control transistor that determines the base or gate voltage of the switching transistor, and whose base or gate voltage depends on the voltage drop across the switching circuit.

If the switching circuit has this configuration, a pulse generator is preferably arranged to short the base and emitter or gate and source of the control transistor, thereby turning it off as described above.

Where the arrangements described herein are intended to be employed with ac circuits, the series switching arrangement will be connected to the line via a rectifying bridge circuit. If the arrangement includes a shunt switching transistor it is preferred for it to be connected between the line and the third terminal via a separate rectifying bridge circuit. Alternatively a pair of equivalent circuit protection arrangements according to the invention maybe employed, the two arrangements handling different cycles of the ac signal. This arrangement has the advantage that the voltage drop across the bridge diodes is removed.

The overcurrent protection arrangement according to the invention may employ bipolar transistors and/or field effect transistors. Where bipolar transistors are used they are preferably used in a Darlington configuration as the switching transistor in order to reduce the base current required when the transistor is switched ON. This base current must be supplied via a resistor connected between the base and collector of the switching transistor. When the circuit switches to its blocking state the switching transistor base current is diverted through the control transistor (which is now ON) and becomes a leakage current. However, since the voltage drop across the resistor is much higher when the arrangement is in is blocking state, the leakage current is larger than the switching transistor base current. If a Darlington pair or triplet is employed as the switching transistor, the effective dc current gain will be increased considerably so that a much higher resistance can be used.

Where field effect transistors are employed, enhancement mode MOSFETs are preferred. The arrangement may be produced as an integrated circuit, in which case the resistors employed in the switching circuit (and in the pulse generator circuit) may be provided by MOSFETs, for example with their gates and drains connected as in NMOS logic. Alternatively, the control transistor and the resistor which together form the voltage divider for the base or gate of the switching transistor may be provided by a complementary n-channel and p-channel pair of FETs connected in the manner of CMOS logic.

The arrangement according to the invention may be formed using discrete components or it may be formed monolithically using well known techniques. Preferably the arrangement is made in monolithic integrated form as such devices are less expensive and are also smaller and more reliable. The use of a divider as described above has the advantage that the value of any capacitors in the pulse generator circuit may be significantly smaller than those that would be required in the absence of the divider, thereby making the circuit more suitable for monolithic integration.

If desired the circuit may include a light emitting diode or other means for indicating that the circuit has switched.

Several circuits in accordance with the present invention will now be described by way of example with reference to the accompanying drawings in which:

FIGS. 5 to 12 are circuit diagrams of forms of resetting circuit protection arrangement according to the invention;

Figure 1:
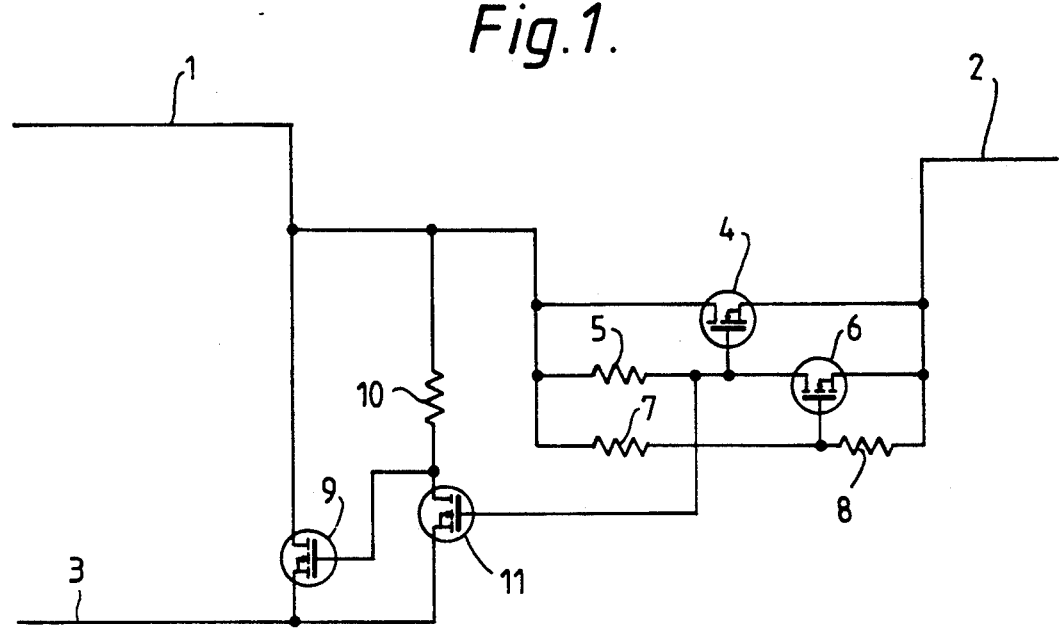
FIG. 1 shows one form of arrangement according to the invention.

FIG. 1 shows a circuit protection device according to the invention suitable for use with a dc circuit, and having three terminals 1, 2 and 3. The device is intended to be series connected in a line of the circuit with terminals 1 and 2 connected to the line and terminal 3 connected to the return line, secondary load or backup system. Alternatively, terminal 3 may be connected to a separate or ground point, optionally via a secondary load.

The arrangement has a series switching circuit which comprises a switching transistor 4 connected in series with the line with its gate connected to a voltage divider which spans the switching transistor 4 and which is formed from a 1 Mohm resistance 5 and a control transistor 6. The gate of the control transistor is connected to a further potential divider formed from two 1 Mohm resistances 7 and 8 which span the switching transistor 4 so that the gate voltage of the control transistor 6 is held at half the voltage drop across switching transistor 4.

The arrangement also has a shunt switching circuit connected to terminal 3 which comprises a shunt switching transistor 9 that controls the flow of current between terminals 1 and 3. The gate of the shunt switching transistor 9 is connected to a voltage divider which spans the switching transistor 9 and which is formed from a 1 Mohm resistance 10 and a shunt control transistor 11. The gate of the shunt control transistor 11 is connected to the same potential divider as is the gate of transistor 4. All the transistors employed in this arrangement are enhancement mode MOSFETs.

In operation terminals 1 and 2 will be connected in a line of the circuit. When no current flows through the circuit all the transistors are in their high resistance or "OFF" state so that the series resistance of the arrangement is about 2 Mohms due to resistances 7 and 8. As the voltage is increased no current will flow until the voltage at the supply terminal 1 reaches the switch on threshold of transistor 4 since transistor 6 is OFF with a resistance in the order of $10^{12}$ ohms and the gate of transistor 4 is therefore held at the input voltage. Once this voltage is exceeded transistor 1 goes into its conductive state and the V/I characteristic follows a line of resistance equivalent to that of the ON state resistance of transistor 4 but offset by the switch on threshold of transistor 4 (about 2 V). At such levels of applied voltage transistor 11, whose gate is maintained at the same voltage as that of transistor 4, is in its ON state which causes the shunt switching transistor to be zero biased and therefore in its OFF state. The arrangement typically has a series resistance of 200 mohms with a voltage drop of 2 V, and a shunt resistance of 1 mohm in its normal operating condition.

If the voltage drop across switch transistor 4 increases due to an overcurrent transient or circuit fault the gate voltage of control transistor 6 will rise until it reaches the switch ON threshold of control transistor 6 whereupon the gate voltage of switch transistor 4 will fall to the value of its source voltage and the transistor will turn OFF. At the same time the gate voltage of shunt control transistor 11 will fall to approximately its source voltage and transistor 11 will turn OFF causing the gate of shunt switching transistor 9 to become forward biased and so turning it ON. Since the voltage drop across series switching transistor 4 in is OFF state is greater than in its ON state, series control transistor 6 will remain forward biased causing the arrangement to stay permanently in its tripped state with series switching transistor 4 in its OFF state and shunt switching transistor 9 in its ON state.

Figure 2:
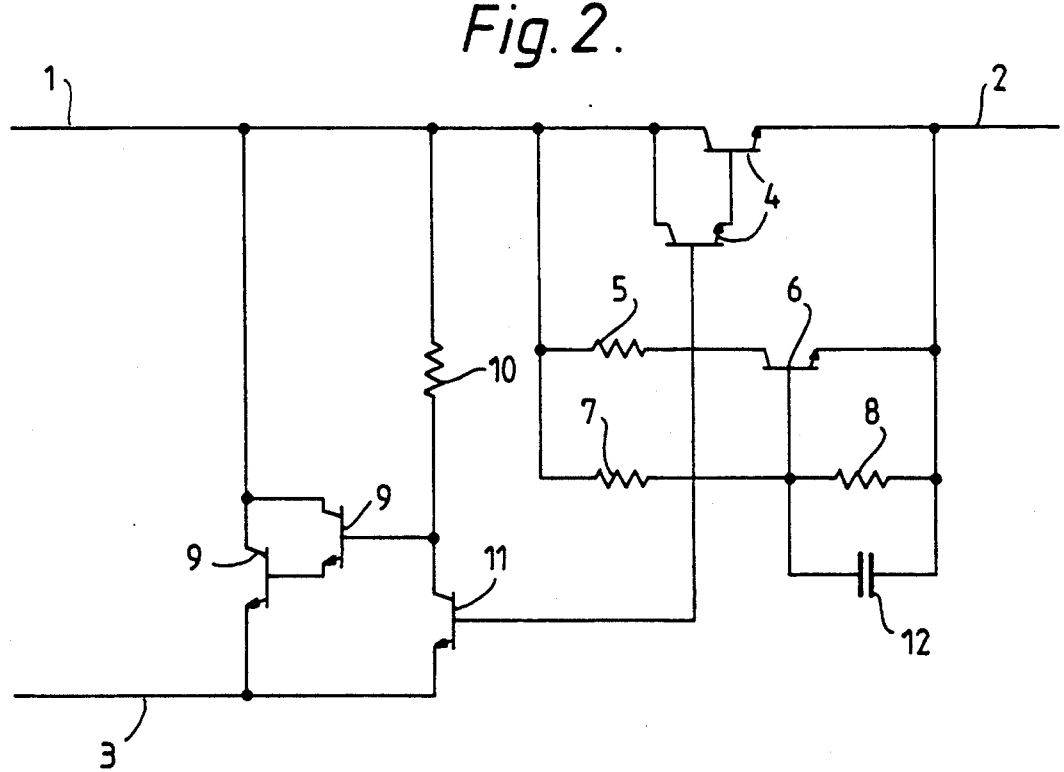
FIG. 2 shows a modification of the arrangement of FIG. 1.

FIG. 2 shows a modification of the circuit of FIG. 1 in which the field effect transistors have been replaced by bipolar junction transistors, and, in the case of series switching transistor 4 and shunt switching transistor 9, by a Darlington pair. In addition a 1 microfarad capacitor 12 is included in parallel with resistance 8. The capacitor 12 prevents tripping of the arrangement by short current transients. If desired the value of the capacitor can be less than 1 D microfarad, such an arrangement giving a sufficient time constant for use with, for example, tungsten filament lamps.

Figure 3:
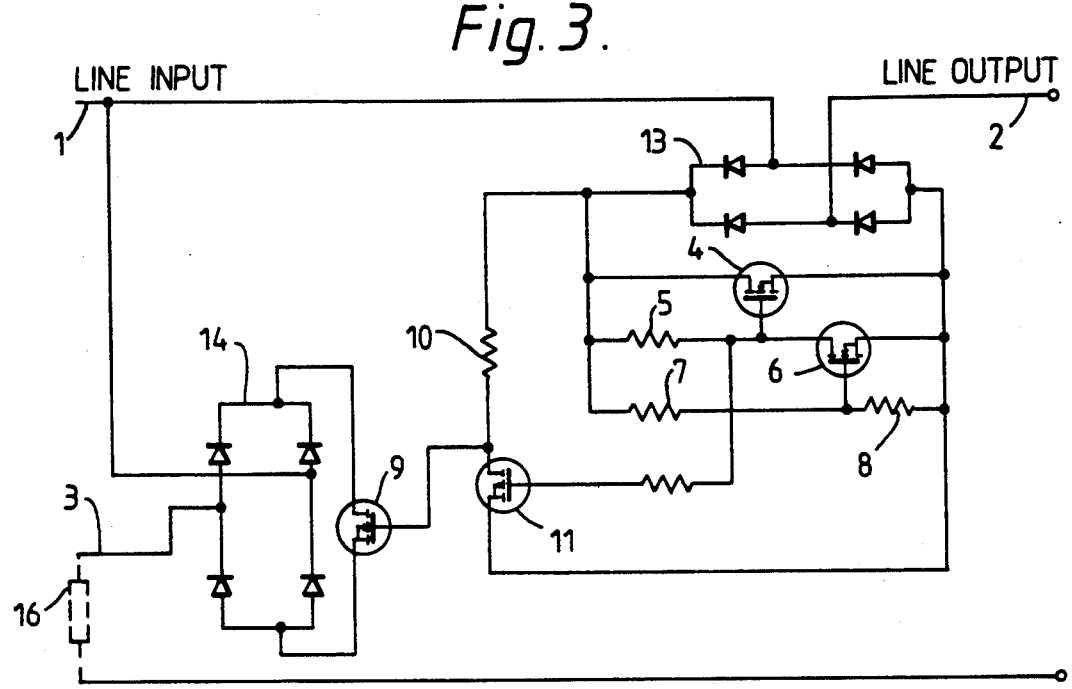
FIG. 3 shows an arrangement according to the invention that may be employed with an ac circuit.

FIG. 3 shows a further modification of the arrangement of FIG. 1 which is suitable for use with an ac circuit. In this arrangement the series switching transistor 4 is connected to the line via a rectifying bridge 13. A further rectifying bridge 14 is employed between the shunt switching transistor 9 and the terminal 3.

In addition the source of the shunt control transistor 11 is connected to the source of the two series transistors 4 and 6 rather than to the source of the shunt switching transistor 9.

Terminal 3 may be connected directly to the return line or it may be connected to a shunt load 16 which may be provided to absorb the transient or alternatively may have an impedance that is matched to that of the line and the circuit load in order to prevent or reduce reflections.

Figure 4:
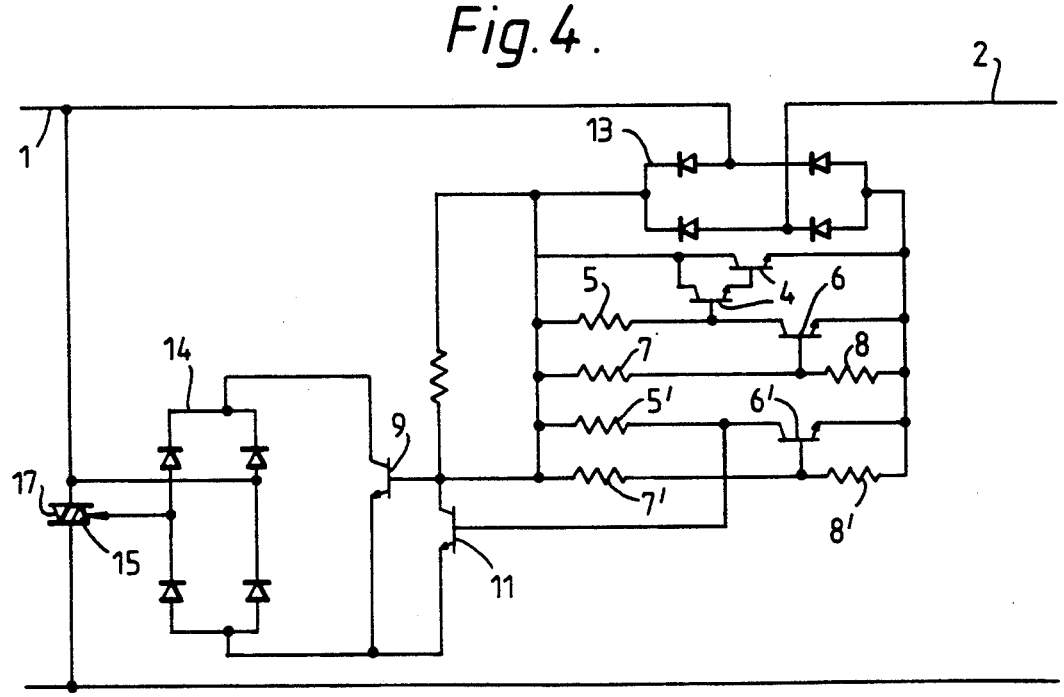
FIG. 4 shows a modification of the arrangement shown in FIG. 3.

FIG. 4 shows a modification of the arrangement shown in FIG. 3 which may, for example, be used in telephone equipment. In this arrangement the shunt line 15 is connected to the base of a triac 17 formed from two thyristors.

In this circuit the base of the shunt control transistor 11 is not connected to the base of the series switching transistors 4 as in FIG. 2, but instead is held in a further voltage divider formed from transistor 6' and 5'. The base of transistor 6' is held in another voltage divider formed by resistors 7' and 8'.

When the arrangement is subjected to a transient the series switching transistor 4 will switch OFF as described above, and the shunt switching transistor 9 will turn ON, thereby causing part of the overcurrent to be injected into the base of the triac 17 and switching the triac ON.

The purpose of using a second voltage divider circuit 5', 6', 7' and 8' is to control the shunt switching circuit and remove any dependence of the switching current on the load of the circuit.

Referring to FIG. 5 of the accompanying drawings, a circuit overcurrent protection arrangement comprises a switching circuit to the right of the broken line, and a pulse generating circuit shown to the left of the broken line. The switching circuit comprises two transistors 101 arranged in a Darlington configuration, forming the switching transistor. The base of the switching transistors is held in a voltage divider formed by a resistor and a control transistor 102, the voltage divider spanning the switching transistors 101, and the base of the control transistor is held in a voltage divider formed by a pair of resistors 103 and 104.

The pulse generator comprises a pulse delay circuit comprising a resistor 105 and capacitor 106 which have a relatively large time constant, in this case about 20 seconds, and which are connected to the base of a pair of transistors 107 and 108 arranged in a Darlington configuration. The collector voltage of transistor 108 is fed into a pulse limiting circuit which comprises a transistor 109 whose base voltage is set by a voltage divider formed by a pair of resistors 110 and 111 and a capacitor 112. A transistor 113 is provided in parallel with capacitor 112 and resistor 111 to drive the base voltage of transistor 109 low when transistor 113 is on.

In operation, under normal currents, the base voltage of transistor 102, which is set by resistors 103 and 104, will maintain its OFF state which causes the Darlington transistors 101 to be ON, and to allow current to flow with a voltage drop of about 1.7 V. If the circuit is subjected to an overcurrent, the base voltage of transistor 102 rises due to increased voltage drop across resistor 104, until transistor 102 turns ON and transistors 101 turn off. The voltage drop across the switching circuit then rises considerably due to the increased resistance of transistors 101, which causes the base emitter voltage of transistor 102 to increase and hold the switching circuit in its OFF state.

When this has occurred, the voltage across the pulse generator will be high enough to overcome the threshold voltage of Zener diode 114, and capacitor 106 will charge. After about 20 seconds the base voltage of transistor 107 will have risen to above 1.2 V and the transistors 107 and 108 will turn on and will turn transistor 113 off. At this point the base voltage of transistor 109 will rise due to the relatively high resistance of resistor 111, transistor 109 will switch on, control transistor 102 will switch OFF and the switching transistor 101 will be forced into its ON state.

If the overcurrent that caused the switching circuit to switch off has disappeared, the voltage drop across the switching circuit, about 1.7 V, will be insufficient to overcome the Zener voltage of the Zener diode 114 with the result that the pulse generating circuit will be isolated and the switch will remain on. If, however, the fault condition persists so that there is a high voltage across the switching circuit, capacitor 112 will charge thereby lowering the base voltage of transistor 109 and switching it off after about 200 ms. This causes control transistor 102 to turn ON and the switching transistors 101 to turn OFF. Because capacitor 112 is charged, and will remain charged, transistor 109, and hence the switching circuit, will remain latched in its OFF state until the supply voltage is removed.

Resistor 115 and Zener diode 116 are provided to ensure that transistor 113 is initially on, to discharge capacitor 112, and to ensure that transistor 109 is OFF. A feedback loop formed from resistor 117 and diode 118 is provided to prevent circuit oscillation by ensuring that transistors 107 and 108 are on when transistor 109 is OFF.

The form of arrangement shown in FIG. 6 employs a switching circuit comprising transistors 101 and 102 and resistors 103 and 104 which operate as described above with reference to FIG. 5. The arrangement has a pulse generation circuit comprising an operational amplifier 121 that acts as a comparator, comparing the voltage of an RC circuit formed from capacitor 122 and resistor 123 with a reference voltage formed by a voltage divider and turning the switching circuit on accordingly.

In operation, when an overcurrent is experienced and the switching circuit turns off, voltage at the non-inverting input of op amp 121 is lower than the inverting input voltage so that the op amp output is low. As the capacitor 122 charges the non-inverting input voltage rises until, after about 150 seconds, it is higher than the inverting input voltage, whereupon the op amp 121 output goes high and transistor 126 turns ON. This turns control transistor 103 OFF and switching transistors 101 briefly ON. The base voltage of transistor 126 is set by an RC voltage divider formed by capacitor 127 and resistor 128. When the output from the op amp goes high, capacitor 127 charges and reduces the base voltage of transistor 126, thereby turning transistor 126 OFF. This has the effect of turning the switching transistors 101 OFF if the fault is still present. The time constant of the RC base circuit of transistor 126 is approximately 200 ms which will determine the pulse duration.

As described with reference to FIG. 5, if the current transient has disappeared, the voltage drop across the switching circuit will be below the Zener voltage of Zener diode 114 when the control transistors 101 are switched ON and the pulse generating circuit will be isolated. However, if the fault condition persists, capacitors 122 and 127 will remain charged and the switching circuit will remain OFF until the supply is removed.

A positive feedback loop formed by resistor 129 and diode 129' are provided to prevent the op amp oscillating. Diode 129' prevents the output from the op amp affecting the charging of capacitor 122 when the output is low.

Figure 7:
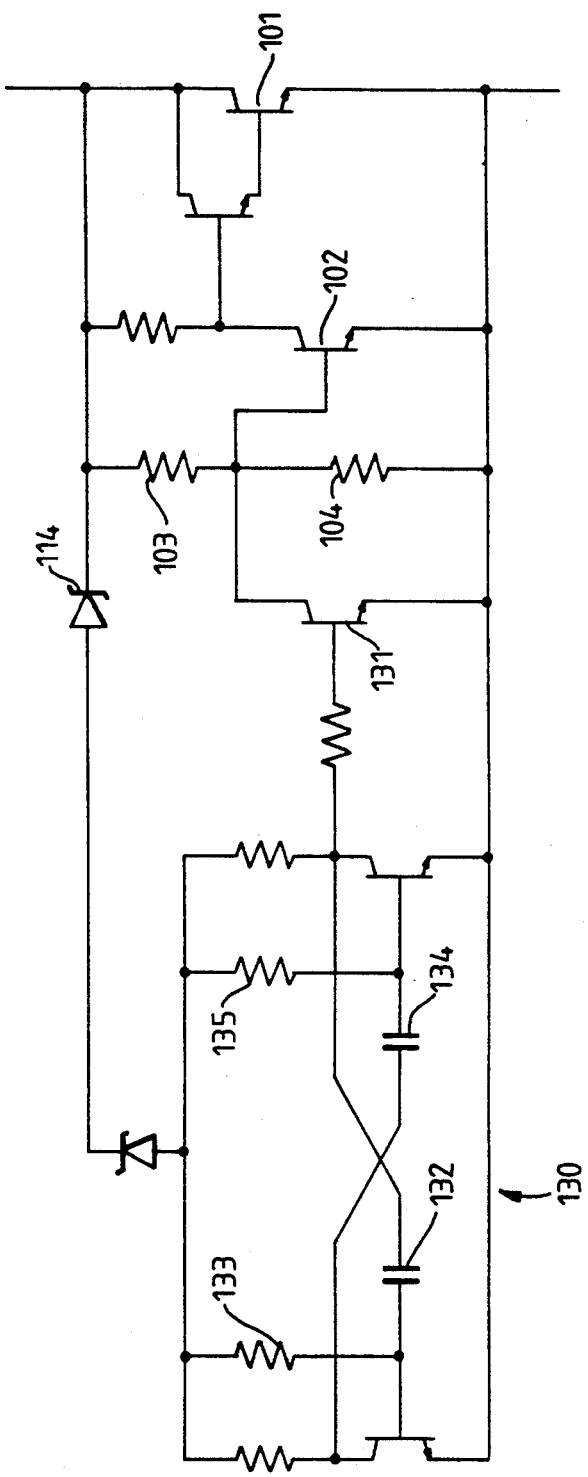

FIG. 7 shows a form of arrangement in accordance with the second aspect of the invention. This arrangement comprises a switching circuit formed from transistors 101 and 102 and resistors 103 and 109, which operates as described above with reference to FIG. 5. The device includes an astable oscillator 130 which is connected to the base of resetting transistor 131. The spacing between pulses generated by the astable oscillator 130 and the duration of the pulses are set by the time constants of the RC circuits formed by capacitor 132 and resistor 133, and by capacitor 134 and resistor 135 respectively.

Figure 8:
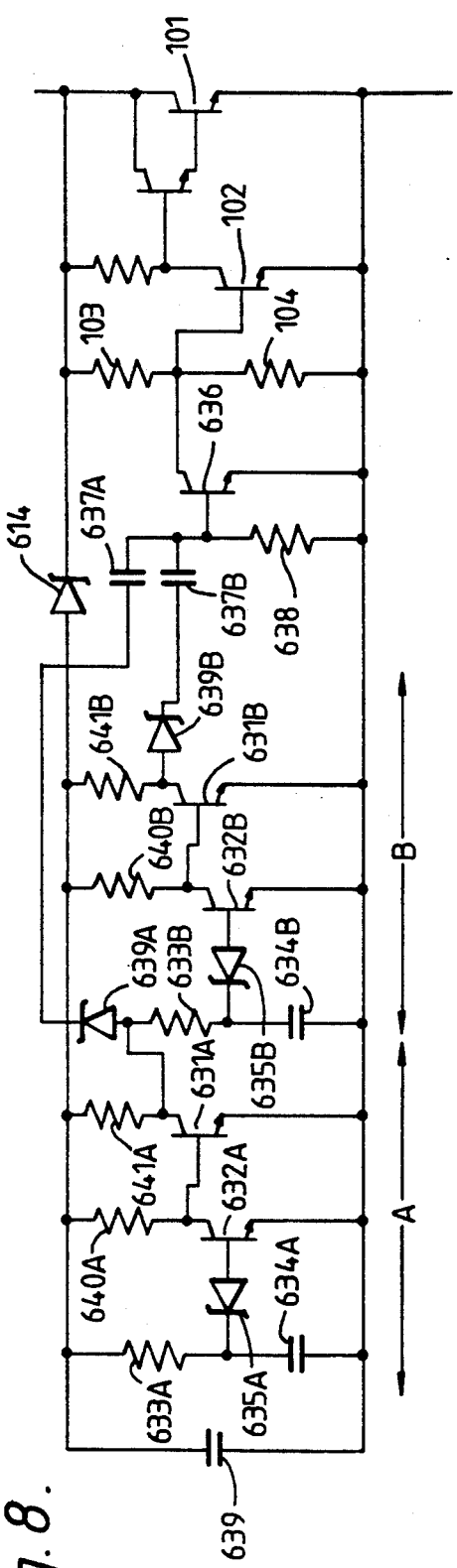

FIG. 8 shows another form of arrangement according to the invention that will attempt to reset itself a finite number of times once it has experienced an overcurrent.

In this arrangement the switching circuit comprising transistors 101 and 102 and resistors 103 and 104 is as described with respect to FIG. 5. The pulse generator is formed from a number of identical stages, two of which are shown as stages A and B, each stage causing one pulse to be generated. Each stage comprises a transistor 631 whose base is connected to the collector of transistor 632 (the corresponding components in different stages being identified by letters "a" and "b"). The base of transistor 632a,b is connected to an RC voltage divider formed from a resistor 633a,b and a capacitor 634a,b via a Zener diode 635 a,b. The collector of transistor 631a,b of each stage is connected to the base of resetting transistor 636 via a capacitor 637a,b and diode 639 a,b. In addition, the collector of transistor 631 of each stage other than the last stage is connected to the RC voltage divider formed by resistor 633b and capacitor 634b of the next stage.

In normal operation the pulse generating circuit will be isolated by Zener diode 630. When the arrangement is subjected to an overcurrent, the switching circuit will switch to its blocking state and current will flow into the pulse generating circuit, charging capacitors 634 and 639. When the voltage across the capacitor 634a rises above the breakdown voltage of Zener diode 635a transistor 632a will turn ON slowly, causing transistor 631a to turn OFF quickly. The sudden rise in the collector voltage of transistor 631a causes resetting transistor 636 briefly to turn ON thereby "shorting" the base-emitter junctions of control transistor 602 and switching transistors 601 ON. Transistor 636 will then turn OFF once capacitor 637a has charged up. If the fault condition has ended the transistors 601 will remain permanently ON. If, however, the fault condition persists capacitor 634b of the second stage will charge up until the voltage across it is greater than the breakdown voltage of diode 635b. The second stage then operates in the same manner as the first stage so that transistor 131b will be turned OFF and the supply voltage will be dropped across resistor 638, turning transistors 636 and 601 ON. As before, if the fault condition has ended the transistors 601 will remain ON, but if it persists, capacitor 637b will charge up, turning transistors 636 and 601 OFF permanently.

Capacitor 639 is included to stabilize the supply to the circuit since the supply to the circuit from the line will be lost briefly when transistors 1 are turned ON to check if the fault has disappeared.

It is possible to alter the number of times the arrangement attempts to reset itself simply by altering the number of stages (shown as A and B) in the arrangement.

Figure 9:
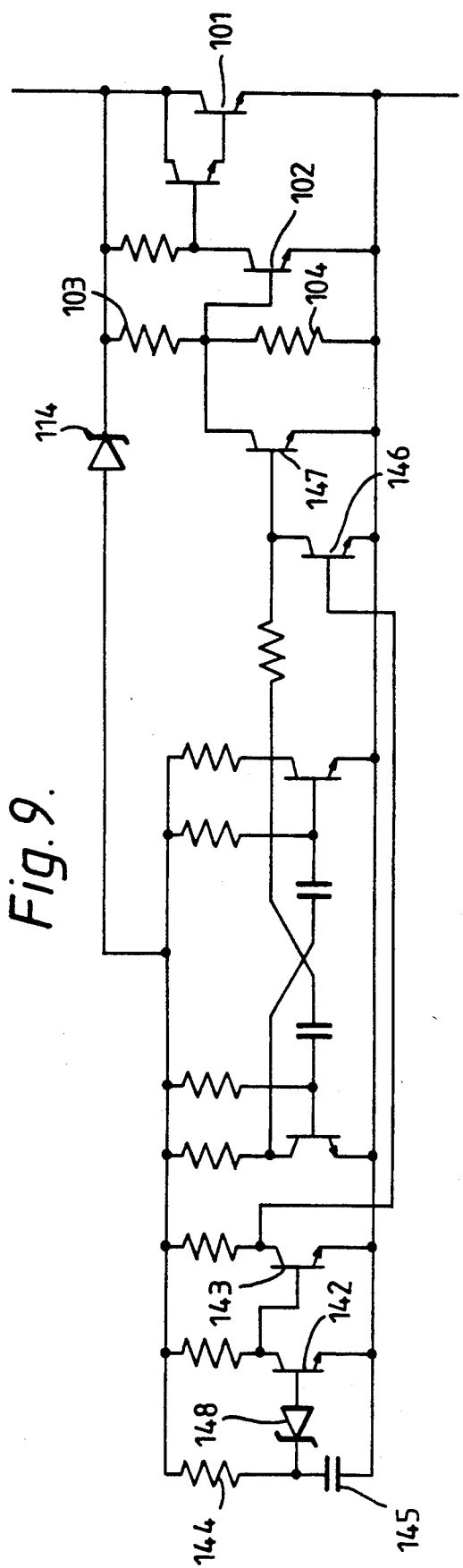

FIG. 9 shows yet another form of arrangement according to the invention that will attempt to reset itself a finite number of times once it has experienced an overcurrent.

This arrangement comprises an overcurrent protection circuit that includes an astable oscillator to cause the circuit to attempt to reset itself indefinitely. Such an arrangement is shown in FIG. 7. The arrangement also includes a pair of transistors 142 and 143 that are controlled by an RC potential divider formed by resistor 144 and capacitor 145. The collector of transistor 143 is connected to the base of a further transistor 146 which is connected across the base emitter terminals of the resetting transistor 147 (corresponding to transistor 131 of FIG. 7).

In operation, when an overcurrent is experienced the circuit will switch OFF and then continually attempt to reset itself periodically by virtue of the astable oscillator, as described in FIG. 7. In addition the voltage across the circuit causes capacitor 145 to charge up. When the capacitor voltage is greater than the Zener voltage of Zener diode 148 transistor 142 begins to turn ON slowly whereupon transistor 143 is turned OFF quickly. This causes transistor 146 to turn ON and "short" the base-emitter terminals of the resetting transistor 147, thereby turning the switching circuit OFF permanently.

Thus, the number of times the circuit attempts to reset itself (N) is given by:

$$N = \frac{\text{Time interval defined by } RC \text{ circuit 44 and 45}}{\text{Interval between reset pulses from the astable oscillator}}$$

N is readily varied by changing the value of capacitor 145. In integrated form, the autoresettable device could be manufactured to be application specific; the number of attempts to reset, being dependent on the area of the capacitor contact, would be left uncommitted until the final contact mask in the fabrication process is employed. This allows the bulk of the manufacturing process to be standardized, regardless of application, whilst also enabling fine timing of the device during the final stages of fabrication to meet specific protection requirements.

Figure 10:
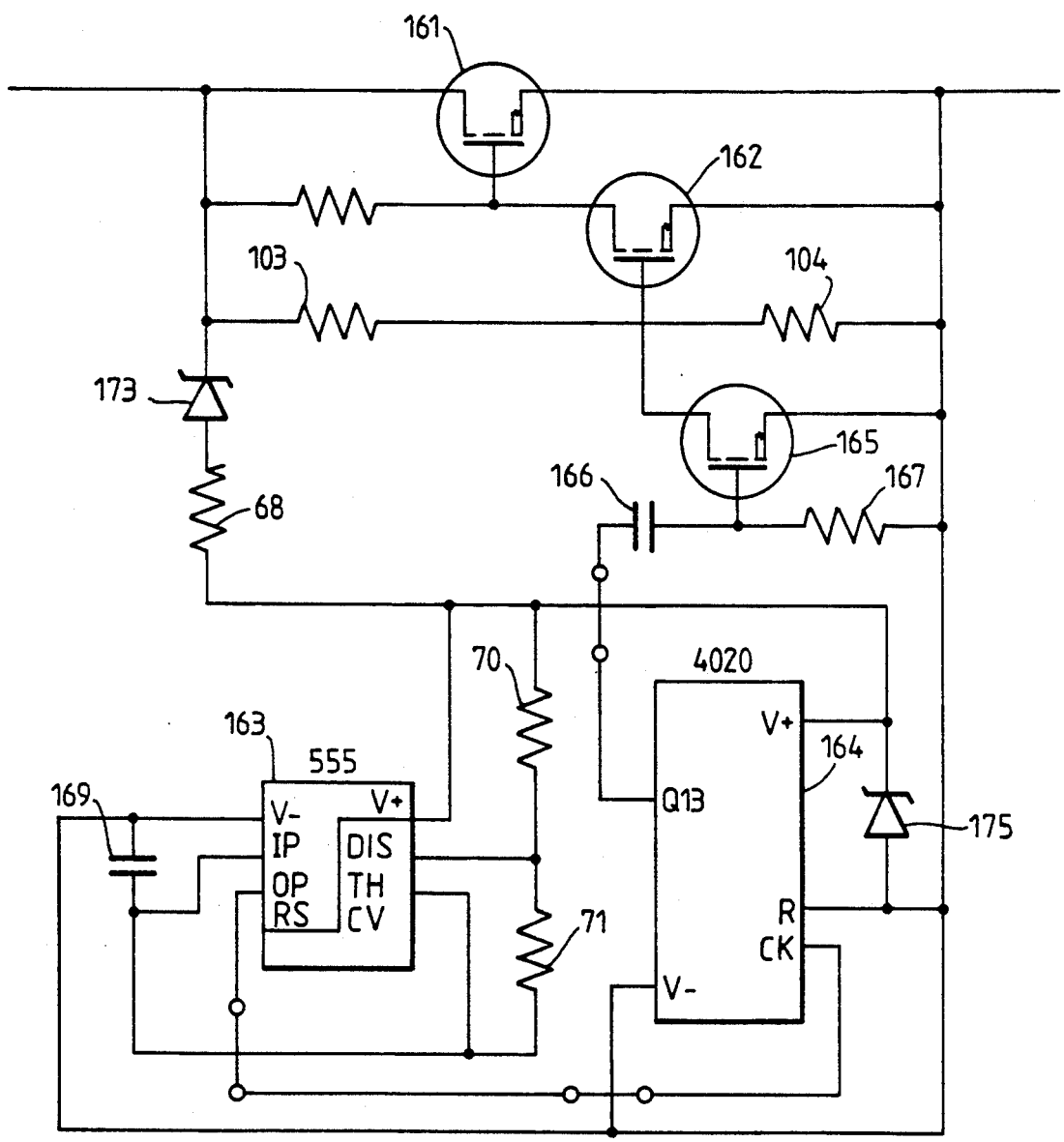

FIG. 10 shows another form of circuit protection arrangement in accordance with the second aspect of the invention in which a pulse generator will attempt to close the switch about once every 20 seconds after the switch has opened.

The switching circuit comprises switching and control FETs 161 and 162 and resistors 103 and 104, and is described with respect to FIG. 5 with the exception that bipolar transistors have been replaced by enhancement mode MOSFETs.

The pulse generator comprises an astable oscillator provided in this case by a 555 timer 163 whose output is fed into the clock input of a 4020 114 bit counter 164 acting as a divider. The output of the counter 164 is fed into the gate resetting FET 165 via a high pass RC filter formed by capacitor 166 and resistor 167. Resetting FET 165 is connected in parallel with resistor 4 so that it will "short" the gate and source of control transistor 162 when its gate goes high, thereby attempting to turn the switching transistor 161 ON.

The 555 timer 163 and counter 164 are powered by a supply taken across the switching transistor 161 and regulated to some extent by Zener diode 175 connected across the supply and ground pins of the devices. Zener diode 175 also protects the counter 164 and timer 163 against the overvoltage. A further 6.8 V Zener diode 173 and 5 kohm resistor 168 are connected in series between the $V_{cc}$ pins of the timer 163 and counter 164 and the drain of the switching transistor 161.

In operation, the switching transistor 161 will normally be ON with control transistor 162 OFF. When an overcurrent is experienced, the gate voltage of control transistor 162 will increase thereby turning the control transistor 162 ON and switching transistor 161 OFF. When the switching transistor 161 has been turned OFF the voltage across it will rise to above 10 V and so provide a roughly constant 5 V supply to the timer 163 and counter 164. The leakage current flowing through the timer and counter supply circuit will be limited by the resistor 168 and will normally be in the order of 1 to 2 mA. When the timer 163 has been powered up it will oscillate with a frequency dependent on the capacitance of capacitor 169 and resistors 170 and 171, and will typically be in the order of 400 Hz, e.g. for a capacitor of 1 nF capacitance and resistors of 1 Mohm resistance. This oscillation is fed into the clock input of the counter, and the most significant bit is taken as the output, having a repetition rate of about once every 20 seconds. The high pass RC filter formed by capacitor 166 and resistor 167 generates a short positive pulse at each positive going edge of the counter output which briefly switches the resetting transistors 165 ON. Thus, the arrangement attempts to reset the switching transistor 161 every 20 seconds during the overcurrent.

Figure 11:
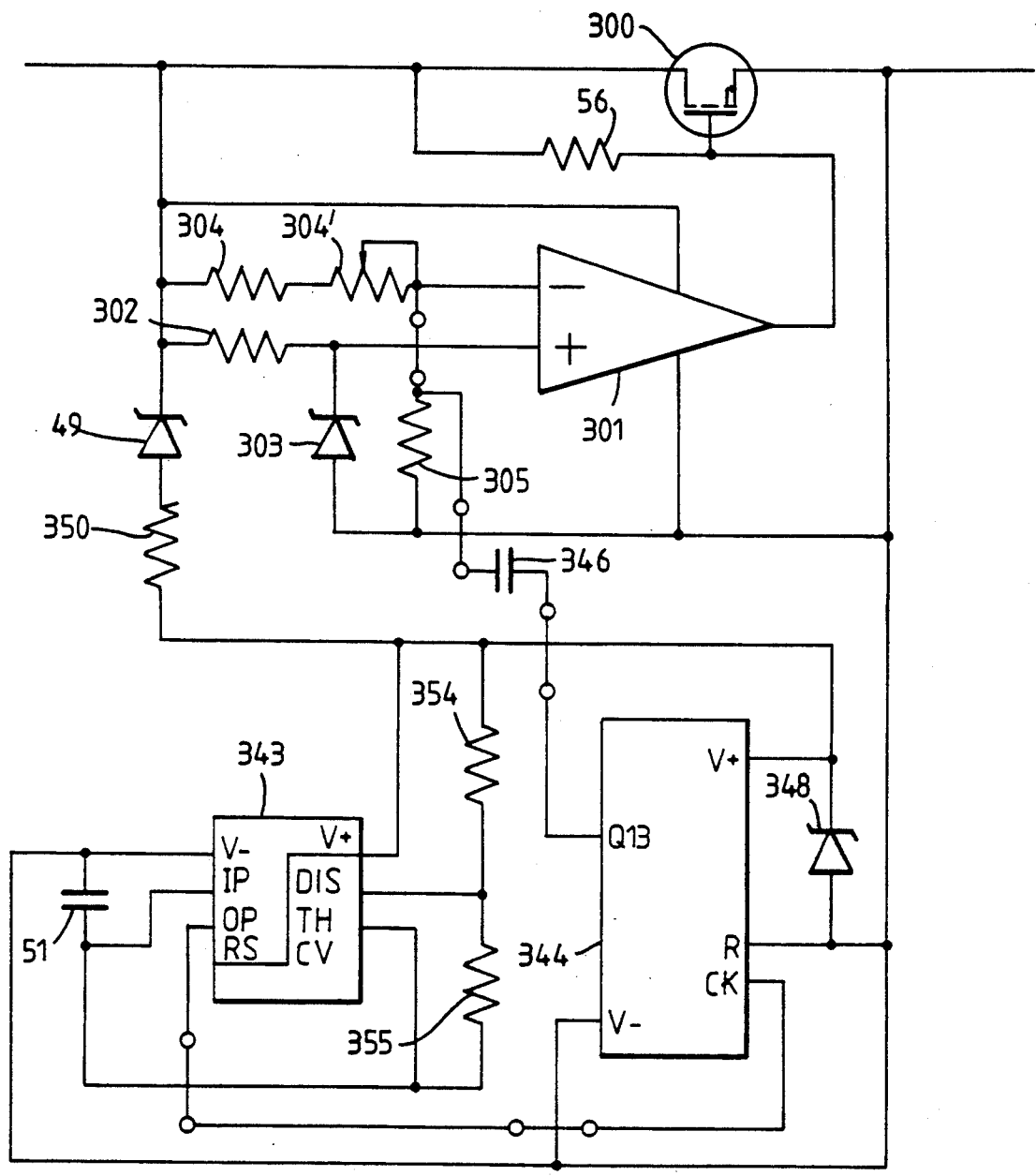

FIG. 11 shows yet another form of arrangement according to the invention. The pulse generator is as described with reference to FIG. 10, but in this case the switching circuit comprises a FET 300 that is connected to the output of an operational amplifier 301 acting as a comparator. The non-inverting input of the op-amp 301 is connected to a voltage divider formed by resistor 302 and Zener diode 303, and the inverting input is connected to a second voltage divider formed by resistors 304, 304' and 305, both voltage dividers spanning the switching transistor 300. The Zener diode 303 had a temperature coefficient of $-0.06\%k^{-1}$.

The Vcc and ground rail terminals of the op amp 301 are also connected across the switching transistor 300 so that the op amp will be powered up when the arrangement experiences an overcurrent.

In operation, the switching transistor 300 will be in its OFF state until su efficient voltage has developed across it to cause the comparator 301 output to drive the gate of switching transistor 300. At this stage the non-inverting input of the comparator 301 will be at a higher voltage than the inverting input in view of the relatively high initial impedance of Zener diode 303, so that the gate of the switching transistor 300 will be driven higher than its emitter and it will conduct. When the arrangement is subjected to an overcurrent, for example from a current transient or a load or source failure, the voltage difference across the switching transistor 300 will increase and so the voltage at the inverting input of the op amp 301 will increase. The voltage at the non-inverting input of the op-amp 301 will also increase until it reaches the Zener voltage of Zener diode 303 whereupon it will remain relatively constant. Thus, at higher overcurrents the output of the op amp will go low, approaching the negative rail voltage, and will switch the switching transistor 300 OFF.

When the switching transistor 300 has been turned OFF the voltage across it will rise to above 10 V and so provide a roughly constant supply to the timer 343 and counter 344 by virtue of Zener diode 348. The leakage current flowing through the timer and counter supply circuit will be limited by the resistor 350 and will normally be in the order of 1 to 2 mA. When the timer 343 has been powered up it will oscillate with a frequency dependent on the capacitance of capacitor 351 and resistors 354 and 355, and will typically be in the order of 400 Hz, e.g. for a capacitor of 1 nF capacitance and resistors of 1 Mohm resistance. This oscillation is fed into the clock input of the counter 344, and the most significant bit is taken as the output, having a repetition rate of about once every 20 seconds.

When the counter output falls to its low value the inverting input of the op amp 301 is briefly brought low (to the source voltage of switching transistor 300) thereby causing the op amp output to rise for a short time (depending on the time constant of capacitor 346 and resistor 305) and turn transistor 100 ON. If the overcurrent still persists the output of the op amp 301 will fall as soon as the pulse finishes and the switching transistor 300 will remain OFF. Thus the arrangement attempts to reset the switching transistor 300 every 20 seconds once it has tripped until it is reset.

Figure 12:
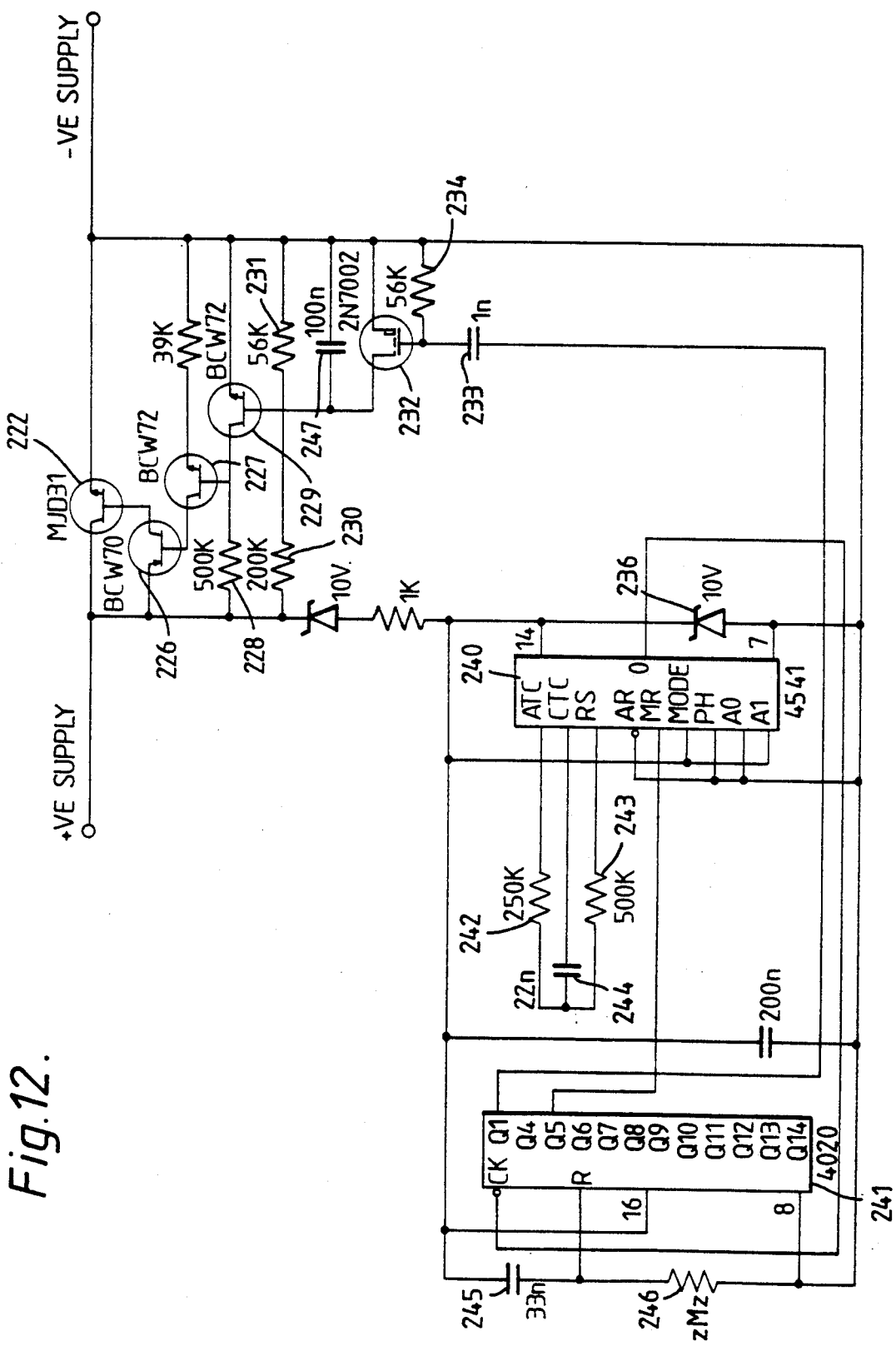

A further arrangement of a protection circuit according to the invention is shown in FIG. 12. The protection circuit comprises a pass transistor 222 that is driven by two transistors 226 and 227 that form a complementary Darlington pair. The base of transistor 227 is connected to a voltage divider that spans the pass transistor 222 and comprises a 228 and a control transistor 229, and the base of the control transistor 229 is held in a voltage divider which also spans the pass transistor and is formed from resistors 230 and 231. A resetting FET 232 is connected across the resistor 231 between the base and emitter of the control transistor 229.

A resetting circuit comprises a 4541 programmable timer 240 and a counter 241. The timer 240 is connected so as to generate a pulse about once every 20 seconds and the pulse is fed into the gate of the resetting transistor 232 via a high pass RC filter formed by capacitor 233 and resistor 234. The pulse is also fed into the clock input of the counter 241 and one of the outputs of the counter, in this case the 04 output, is fed back into the master reset pin of the timer 240. Both the timer 240 and the clock 241 are powered by the voltage appearing across the pass transistor clipped to 10 V by Zener diode 236.

When an overcurrent is experienced the voltage across the pass transistor 22 increases until the base emitter voltage of control transistor 229 is sufficient to turn it on. This effectively shorts the base-emitter junction of transistor 227 and turns transistors 222, 226 and 227 OFF.

Since the pass transistor 222 has been turned off, substantially the entire voltage drop occurs across the protection circuit, thereby powering timer 240 and counter 241. The timer 240 is programmed by resistors 242 and 243 and capacitor 244 to generate pulses about every 20 seconds which are sent to the gate of the resetting transistor 232. Whenever the resetting transistor 232 receives a pulse it turns on and "shorts" the base-emitter junction of the control transistor 229, thereby turning it off and turning the pass transistor on. If the fault still exists, the pass transistor will turn off again as soon as capacitor 233 has charged up enough.

This process occurs each time timer 240 generates a pulse. However, each timer pulse is fed into the clock input of counter 241, and once eight pulses have been generated by the timer 240 the counter output goes high and disables the timer 240. If the overcurrent has not cleared by this stage the protection circuit will continue to block current in the line until the power is switched off.

An RC voltage divider formed by resistor 246 and the capacitor 245 sends a pulse to the reset pin of the counter 241 to reset the counter on power-up. In addition, a 100 nF capacitor 247 is connected across the resistor 231 and the base emitter junction of the control transistor 229 in order to disable switching for a short time on switch-on in case the load is capacitive.

Figure 13:
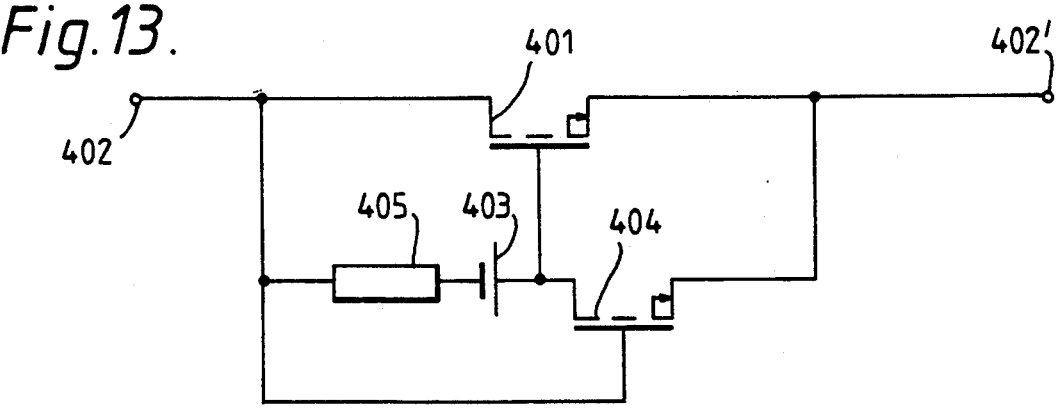
FIG. 13 is a circuit diagram of a low voltage crop circuit protection arrangement according to the invention.

FIG. 13 shows the circuit of a two-terminal device for protecting a circuit from an overcurrent. The device comprises an enhancement mode switching MOSFET 401 that is connected between the terminals 402 and 402' of the device so that it passes the entire circuit current. The gate of switching transistor 401 is connected to its drain via battery 403 which offsets the gate voltage from the drain by the battery voltage and current limiting resistor 405.

An enhancement mode control MOSFET 404 is connected across the gate source junction of the switching transistor 401 in order to switch the switching transistor OFF when an overcurrent is experienced, the gate of the control transistor being connected directly to the drain of the switching transistor 401.

Figure 14:
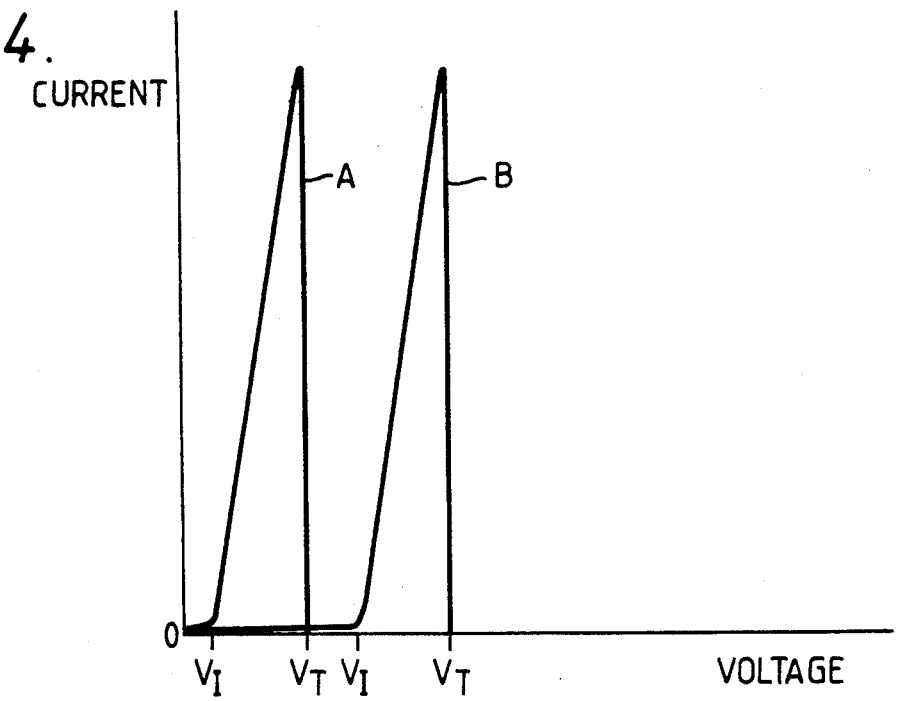
FIG. 14 is a graph showing the I-V characteristics of the circuit of FIG. 13 and of the prior art.

In normal operation of the circuit, if there is no current in the line, the switching transistor 401 will be ON or OFF depending on whether battery 403 offsets the transistor gate by more or less than the threshold voltage of the transistor. When the line is loaded the voltage across the switching transistor 401 will increase as the current increases as shown in FIG. 14 curve A, the slope of the curve depending on the switching transistor channel resistance. The voltage will continue to rise with increasing loading of the circuit until the trip voltage $V_T$ is reached at which point drain source voltage of the switching transistor 401 is equal to the threshold voltage of the control transistor 404, and the control transistor "shorts" the gate and source terminals of the switching transistor.

Once the arrangement has switched it will remain latched in its high resistance state even after the overcurrent has subsided because the resistance of transistor 401 is such that the entire circuit voltage is dropped across it. Thus, the arrangement must be disconnected from the circuit supply or load before it will reset itself. Current limiting resistor 405 prevents rapid draining of the battery 403 when the arrangement has tripped.

By way of comparison the I-V characteristic of a protection device in accordance with German Application No. P 37 25 390 (employing FETS) is shown as curve B. This curve has the same form as curve A but is offset to a higher voltage drop. This is due to the fact that an initial voltage drop $V_I$ must occur across the switching transistor ' before the gate of the control transistor reaches the threshold voltage.

Figure 15:
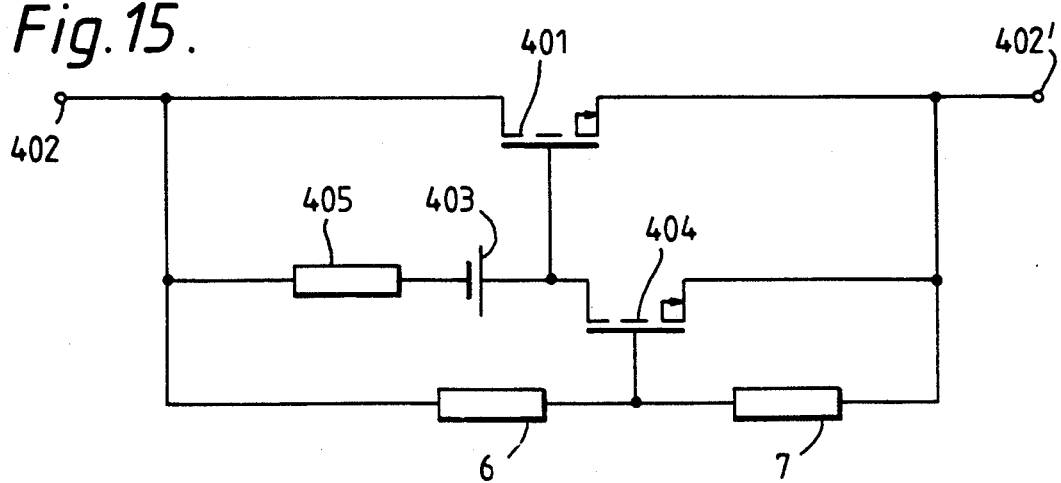
FIG. 15 is a circuit diagram of an alternative form of low voltage drop arrangement according to the invention.

FIG. 15 shows an alternative arrangement for a two terminal protection device in which an enhancement mode MOSFET 401 passes the operating current of the circuit. The gate of switching transistor 401 is connected to its drain via a battery 403 (e.g. about 1.5 V) and 401 Mohm current limiting resistor 405, and a control MOSFET 404 is connected across the gate-source junction of transistor 401, as described with reference to FIG. 13. However, in this circuit the gate voltage of the control transistor 404 is held by a voltage divider formed from 1 Mohm resistance 6 and 1.22 Mohm resistance 407 which span the switching transistor. In operation this arrangement will perform in the same manner as that shown in FIG. 13 with the exception that the magnitude of the current required to cause it to switch is determined by the potential divider resistors 406 and 407 in addition to the threshold voltage of transistor 404 and channel resistance of switching transistor 401.

If desired, the battery can be connected between the gate and source of the switching transistor provided its polarity is changed.

Figure 16:
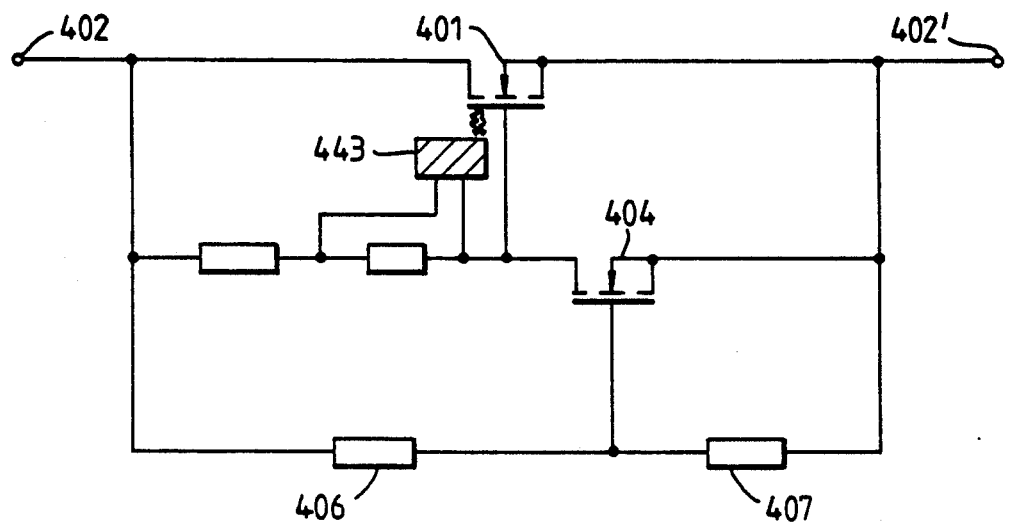
FIGS. 16 and 17 are circuit diagrams of further forms of low voltage drop arrangement according to the invention that employ different voltage sources.

FIG. 16 shows a similar arrangement to that shown in FIG. 15 in which the gate voltage of switching transistor 401 is controlled by control transistor 404 whose gate voltage is set by a voltage divider formed from resistors 406 and 407 that span the switching transistor 401.

In this arrangement the gate of the switching transistor is connected to its drain via a Seebeck device 443 that is in thermal contact with the switching transistor 401 so that any heat generated in the switching transistor will cause a temperature difference between the junctions of the Seebeck device.

In operation, when current first flows along the circuit line, the switching transistor is cold and no voltage is generated by the Seebeck device 443 so that an initial voltage drop of 1 to 2 volts occurs across the switching transistor 401 as shown in FIG. 14 curve B. However, the heat generated in the switching transistor 401 by virtue of this voltage drop will cause a voltage to be generated by the Seebeck device 443 which will bias the switching transistor's gate toward its drain and so reduce the voltage drop across the switching transistor. Thus, a feedback mechanism is established that reduces power dissipated in the switching transistor.

As with the arrangement shown in FIG. 15, if an overcurrent occurs the arrangement will switch to its non-conducting state when the voltage drop across the switching transistor 401 is sufficient to raise the gate source voltage of transistor 404 to its threshold value.

In an alternative arrangement the output of the Seebeck device may be connected in parallel with resistor 405, which is preferably when being used with a bipolar switching transistor so that sufficient initial base current can be provided. The Seebeck output may instead be connected between the gate and source of the switching transistor.

Figure 17:
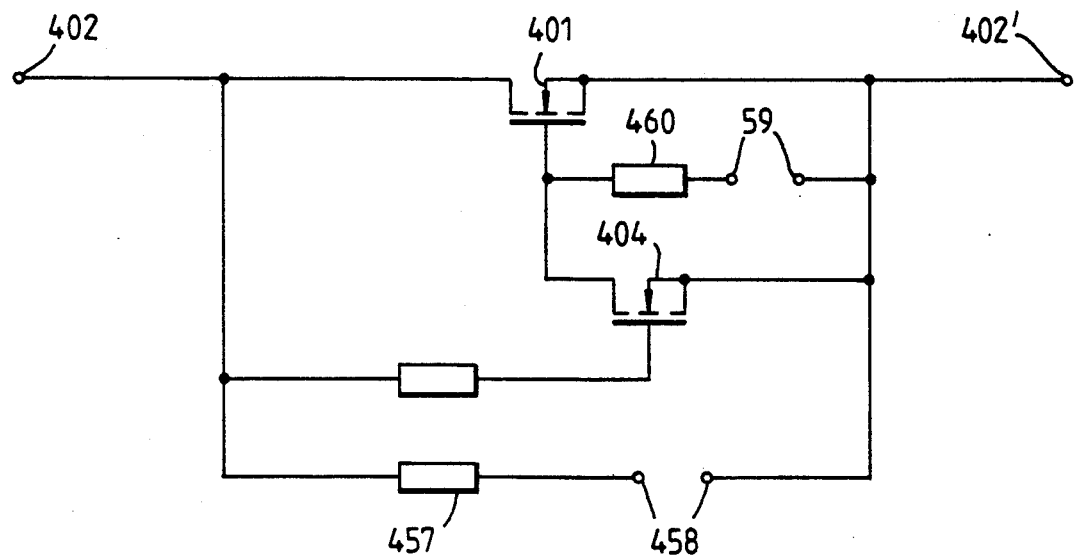

FIG. 17 shows yet another form of arrangement according to the invention. In this arrangement switching transistor 401 is series connected in a line of the circuit and its gate and source are connected together via control transistor 404. The gate voltage of control transistor 404 is set by resistors 456 and 457 and the voltage drop across switching transistor 401.

A dc—dc converter is included in order to convert a low voltage appearing across the switching transistor 401 or part of that voltage, to a higher voltage to offset the gate of switching transistor 401. The input 458 of the dc-dc converter is taken between resistor 457 and the source of the transistors 401 and 404, and the output 459 of the converter is connected between the gate and source of the switching transistor 401, in series with current-limiting resistor 460. It is quite possible, however, to connect the output 459 between the gate and drain of the switching transistor 401.

In use, any voltage that appears across the switching transistor 401 will be multiplied and fed back by the dc-dc converter to offset the gate of switching transistor 401. This has the effect that for all currents up to the trip current the switching transistor has a relatively constant low resistance and has an initial voltage drop ($V_I$ in FIG. 14) of zero volts. Resistor 460 prevents the control transistor 404 in its ON state from loading the output 458 of the dc—dc converter.

If the arrangement is subject to an overcurrent, it will trip into its high resistance state when the voltage drop across the switching transistor 401 causes the gate source voltage of control transistor 404 to rise to its threshold value, whereupon the current flowing through the switching transistor 401 falls to substantially zero.

This form of arrangement has the advantage that all the components employed are relatively reliable and do not need to be replaced, and in addition, all the components are capable of integration to form a monolithic device.

Figure 19:
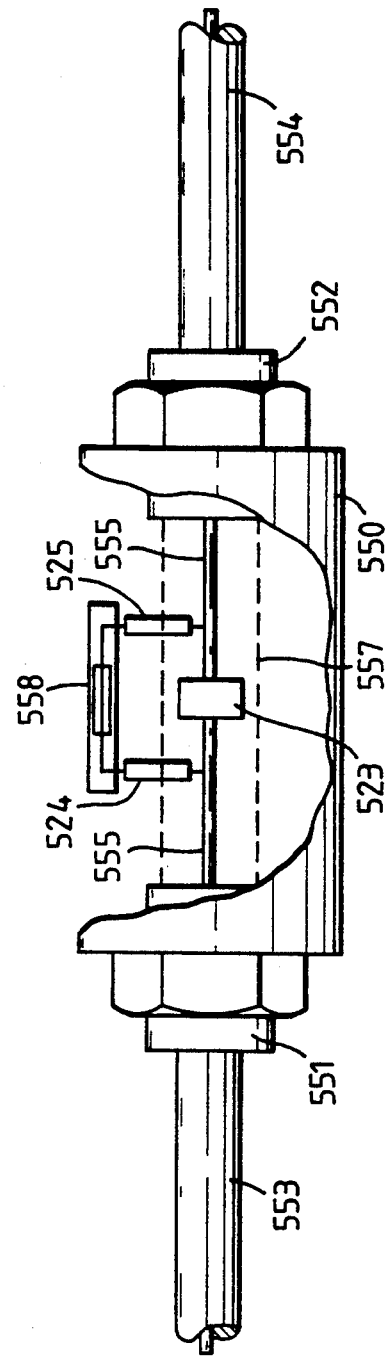
FIG. 19 is a schematic partly cut away side view of the module.
Figure 18:
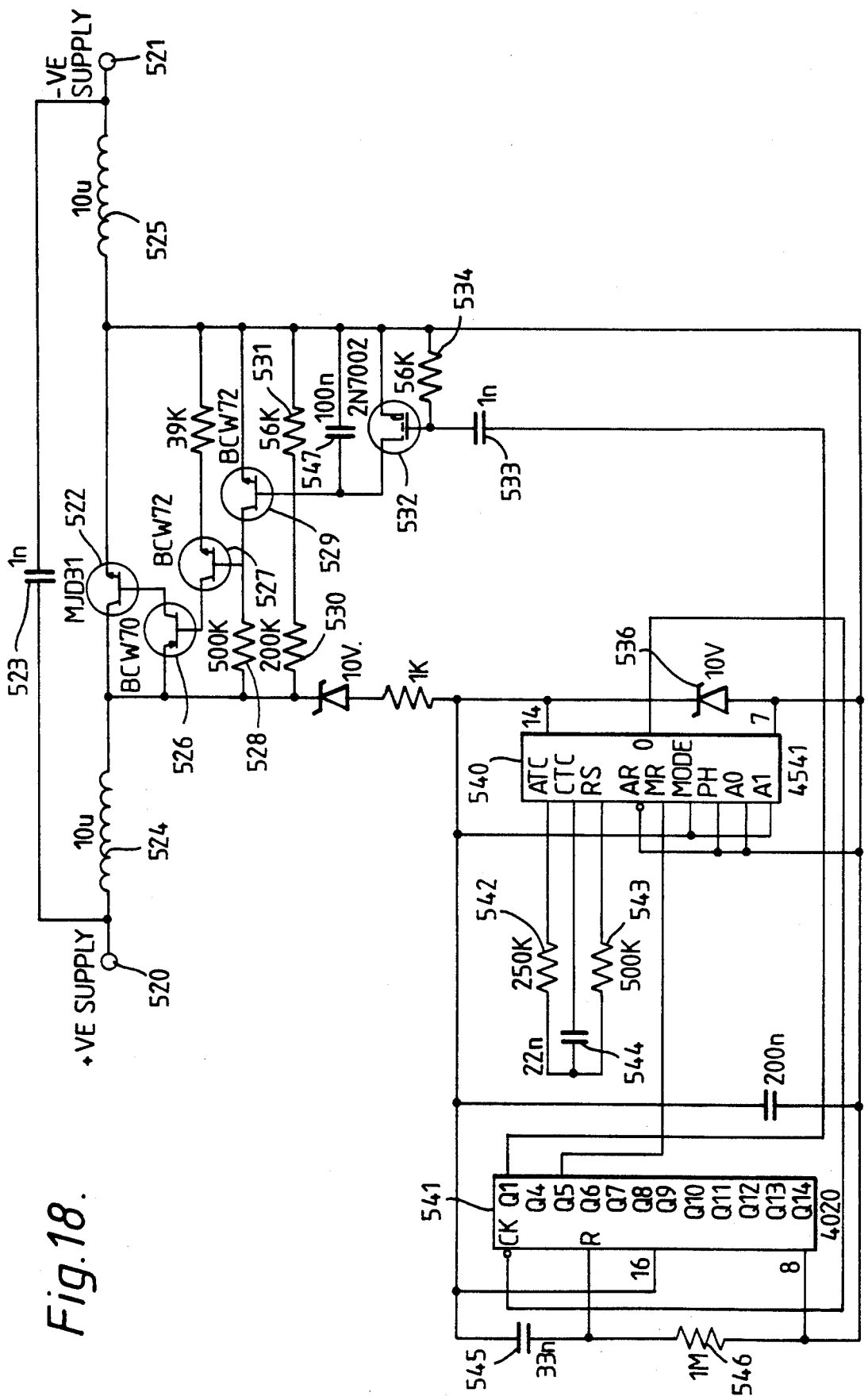
FIG. 18 is a circuit diagram of a CATV module according to the invention.

FIGS. 18 and 19 show a module for insertion into a line of a CATV system for protecting the system against an overcurrent has a pair of terminals 520 and 521 for connection to one of the conductors of the line, the terminals being connected together via a 1 nF capacitor 523 to allow the ac signals on the line to pass through the line. A dc protection circuit is connected across the capacitor 523 via a pair of 10 μH inductors 524 and 525 to isolate it from the signals on the line. The protection circuit comprises a pass transistor 522 that is connected between the inductors and is driven by two transistors 526 and 527 that form a complementary Darlington pair. The base of transistor 527 is connected to a voltage divider that spans the pass transistor 522 and comprises a 2.2 Mohm resistor 528 and a control transistor 529, and the base of the control transistor 529 is held in a voltage divider which also spans the pass transistor and is formed from resistors 530 and 531. A resetting FET 532 is connected across the resistor 531 between the base and emitter of the control transistor 529.

A resetting circuit comprises a 4541 programmable timer 540 and a counter 541. The timer 540 is connected so as to generate a pulse about once every 20 seconds and the pulse is fed into the gate of the resetting transistor 532 via a high pass RC filter formed by capacitor 533 and 534. The pulse is also fed into the clock input of the counter 541 and one of the outputs of the counter, in this case the 04 output, is fed back into the master reset pin of the timer 540. Both the timer 540 and the clock 541 are powered by the voltage appearing across the pass transistor clipped to 10 V by Zener diode 536.

In use, circuit signals will pass through the module via capacitor 523 with very little attenuation while the dc power supply passes through transistor 522. The base current required to keep pass transistor 522 on is supplied by transistors 526 and 527. In normal operation these transistors are also on since the base of transistor 527 is held at its collector voltage by the voltage divider formed by resistor 528 and control transistor 529 which is off.

When an overcurrent is experienced, for example by shorting the conductors of the coax cable, the voltage across the pass transistor 522 increases until the base emitter voltage of control transistor 529 is sufficient to turn it on. This effectively shorts the base-emitter junction of transistor 527 and turns transistors 522, 526 and 527 off.

Since the pass transistor 522 has been turned off, substantially the entire dc voltage drop of the power circuit occurs across the protection circuit, thereby powering timer 540 and counter 541. The timer 540 is programmed by resistors 542 and 543 and capacitor 544 to generate pulses about every 20 seconds which are sent to the gate of the resetting transistor 532. Whenever the resetting transistor 532 receives a pulse it turns on and "shorts" the base-emitter junction of the control transistor 529, thereby turning it off and turning the pass transistor on. If the fault still exists, the pass transistor will turn off again as soon as capacitor 533 has charged up enough.

This process occurs each time timer 540 generates a pulse. However, each timer pulse is fed into the clock input of counter 541, and once eight pulses have been generated by the timer 540 the counter output goes high and disables the timer 540. If the overcurrent in the line has not cleared by this stage the protection circuit will continue to block the dc power in the line until the power is switched off.

The physical layout of the components of the module is shown in FIG. 19. The module comprises an aluminium housing 550 that has a connection piece 551 and 552 at each end thereof for connection to a pair of coax cables 553 and 554 that form a line of a CATV system. The control conductors 555 of the coax cables are connected together via capacitor 523, and are enclosed within a screen 557 that is dimensioned so as to match the impedance of the line. A protection circuit 558 described above either mounted on a PCB or in the form of an integrated circuit is located outside the screen 557 and is connected to the control conductor 555 of the coax cables on either side of the capacitor 523 by means of the inductors 524 and 525.

We claim:
1. A module for insertion into a combined signal and power carrying line for protecting a system associated with the line from an overcurrent, which comprises:
(i) a housing having connection ports for cables forming the line and being impedance matched to the line, one of the conductors of the cables being connected together via a capacitor; and (ii) a solid-state overcurrent protection circuit that is connected across the capacitor via inductors to isolate it from the signal on the line, the protection circuit being capable of switching from a conducting state to a blocking state in response to an overcurrent and being capable of resetting itself or attempting to reset itself into its conducting state one or more times after it has switched into its blocking state.

2. A module as claimed in claim 1, wherein the protection circuit comprises a switching transistor and a control transistor that determines the base or gate voltage of the switching transistor.

3. A module as claimed in claim 2, which includes no resistive components in series with the switching transistor other than the inductor so that the voltage drop across the protection circuit is substantially solely due to the collector-transistor.

4. A module as claimed in claim 2, wherein the base or gate voltage is determined by the voltage drop across the switching transistor.

5. A module as claimed in claim 4, wherein the base or gate of the control transistor is held in a voltage divider that spans the switching transistor.

6. A module as claimed in claim 2, wherein a pulse generator is arranged to short the base and emitter or the gate and source of the control transistor when a pulse is generated in order to reset, or attempt to reset, the protection circuit.

7. A module as claimed in claim 6, which includes a resetting transistor for shorting the base and emitter or gate and source of the control transistor, the base or gate voltage of the resetting transistor being taken from the pulse generator.

8. A module as claimed in claim 2, wherein the switching transistor and/or the control transistor comprises an enhancement mode MOSFET.

9. A module as claimed in claim 1, wherein the switching transistor comprises a plurality of bipolar junction transistors in a Darlington configuration.

10. A module as claimed in claim 1, wherein the pulse generator comprises a counter whose input is supplied by an astable oscillator.

* * * * *

UNITED STATES PATENT AND TRADEMARK OFFICE
CERTIFICATE OF CORRECTION

PATENT NO.      : 5,319,515

INVENTOR(S)  : Pryor et al.

DATED            : June 7, 1994

It is certified that error appears in the above-identified patent and that said Letters Patent is hereby corrected as shown below:

Title Page, References Cited, U.S. Patent Documents, before "4,513,343" insert, as a new line, --4,491,892, 1/1985, Lehmann et al., 361/101--.

Title Page, Page 2, References Cited, U.S. Patent Documents, before "4,604,674" insert, as a new line, --4,603,234, 7/1986, Huet et al., 179/16AA--.

Title Page, Page, 2 References Cited, U.S. Patent Documents, before "4,736,268" insert, as two new lines, --4,661,879, 4/1987, Sato et al., 361/58-- and --4,723,190, 2/1988, Chung, 361/91--.

Title Page, Page 2, References Cited, U.S. Patent Documents, after "4,937,697, 6/1990, Edwards et al., 361/18" insert, as a new line, --5,095,261, 3/1992, Schoofs, 323/222--.

Title Page, Page 1, References Cited, Foreign Patent Documents, before "3204338" insert, as a new line, --2811696, 9/1979, Germany, H03K 17/16--.

Title Page, Page 2, References Cited, Foreign Patent Documents, before "107500" insert, as a new line, --WO92/07403, 4/1992, PCT Int'l Appl, H02H 3/087--.

UNITED STATES PATENT AND TRADEMARK OFFICE
CERTIFICATE OF CORRECTION

PATENT NO. : 5,319,515

INVENTOR(S) : Pryor et al.

DATED : June 7, 1994

It is certified that error appears in the above-identified patent and that said Letters Patent is hereby corrected as shown below:

Title Page, Page 2, References Cited, Foreign Patent Documents, after "2208193, 3/1989, United Kingdom, H02H 3/08" insert, as a new line, --2230665, 10/1990, United Kingdom, H02H 3/08--.

Title Page, Page 2, References Cited, Other Publications, before "International Search Report…PCT/GB91/01760…" insert, as three new lines --British Search Report, Application No. 9114717.3--, --International Search Report, Application No. PCT/GB92/01237-- and --International Search Report, Application No. PCT/GB92/01739--.

Column 9, line 4, replace "control" by --controls--.
Column 10, line 8, before "conductors" insert --the--.
Column 12, line 54, replace "mohm" by --Mohm--.
Column 12, line 67, replace "is" by --its--.
Column 13, line 13, delete "D".
Column 17, line 68, replace "-0.06k$^{-1}$" by -- -0.06K$^{-1}$--.
Column 18, line 1, replace "Vcc" by --V$_{cc}$--.

UNITED STATES PATENT AND TRADEMARK OFFICE
CERTIFICATE OF CORRECTION

PATENT NO. : 5,319,515

INVENTOR(S) : Pryor et al.

DATED : June 7, 1994

It is certified that error appears in the above-identified patent and that said Letters Patent is hereby corrected as shown below:

Column 18, line 6, replace "su efficient" by --sufficient--.
Column 18, line 57, before "228" insert --resistor--.
Column 19, line 8, replace "22" by --222--.
Column 20, line 17, remove "'".
Column 21, line 3, replace "preferably" by --preferable--.
Claim 3, line 5, after "collector-" insert --emitter or drain-source voltage drop of the switching--.

Signed and Sealed this

Seventeenth Day of January, 1995

BRUCE LEHMAN

*Commissioner of Patents and Trademarks*

Attest:

*Attesting Officer*